US006976002B1

(12) United States Patent
Ferguson et al.

(10) Patent No.: US 6,976,002 B1
(45) Date of Patent: Dec. 13, 2005

(54) SYSTEM AND METHOD OF DETERMINING A KNOWLEDGE MANAGEMENT SOLUTION

(75) Inventors: Karen R. Ferguson, East Grand Rapids, MI (US); Christine C. Albertini, Grand Rapids, MI (US); Erik Christian Kiaer, Chicago, IL (US); Lawrence J. Keeley, Chicago, IL (US); Dev Patnaik, Burlingame, CA (US); Ben Jacobson, Evanston, IL (US); Kris Ryan Cohen, Chicago, IL (US); Shannon Kathleen Ford, Evanston, IL (US); Julie Elizabeth Hastings, Chicago, IL (US); Elizabeth Marie Perez, Chicago, IL (US); Paul Perkins Ratliff, Chicago, IL (US)

(73) Assignee: Steelcase Development Corporation, Grand Rapids, MI (US)

( * ) Notice: Subject to any disclaimer, the term of this patent is extended or adjusted under 35 U.S.C. 154(b) by 0 days.

(21) Appl. No.: 09/382,141

(22) Filed: Aug. 24, 1999

(51) Int. Cl.[7] ............................................. G06F 17/60
(52) U.S. Cl. .................................. 705/11; 705/8; 705/9
(58) Field of Search .................................. 705/8, 11, 9

(56) References Cited

U.S. PATENT DOCUMENTS

| | | | |
|---|---|---|---|
| 1,419,809 A | 6/1922 | Bowles, Jr. | |
| 4,992,940 A | 2/1991 | Dworkin | |
| 5,111,391 A | 5/1992 | Fields et al. ................. | 364/401 |
| 5,117,353 A | 5/1992 | Stipanovich et al. ........ | 374/401 |
| 5,164,897 A * | 11/1992 | Clark et al. ...................... | 705/1 |
| 5,197,004 A | 3/1993 | Sobotka et al. | |
| 5,212,635 A | 5/1993 | Ferriter ....................... | 364/402 |
| 5,326,270 A * | 7/1994 | Ostby et al. ................. | 434/362 |
| 5,416,694 A * | 5/1995 | Parrish et al. .................. | 705/8 |
| 5,487,135 A | 1/1996 | Freeman ....................... | 395/75 |
| 5,500,795 A | 3/1996 | Powers et al. ............... | 364/401 |
| 5,530,861 A | 6/1996 | Diamant et al. ............. | 395/650 |
| 5,551,880 A * | 9/1996 | Bonnstetter et al. ......... | 434/236 |
| 5,684,964 A | 11/1997 | Powers et al. ............... | 395/211 |
| 5,726,914 A | 3/1998 | Janovski et al. ............. | 364/552 |
| 5,732,398 A | 3/1998 | Tagawa ........................... | 705/5 |
| 5,734,837 A | 3/1998 | Flores et al. ................. | 395/207 |
| 5,765,140 A | 6/1998 | Knudson et al. ................ | 705/9 |
| 5,795,155 A | 8/1998 | Morrel-Samuels ........... | 434/107 |
| 5,799,286 A | 8/1998 | Morgan et al. ................ | 705/30 |
| 5,806,068 A | 9/1998 | Shaw et al. .................. | 707/103 |

(Continued)

FOREIGN PATENT DOCUMENTS

JP             08235261 A   *   9/1996           G06F 17/60

(Continued)

OTHER PUBLICATIONS

Molleman et al. "Self-organizing groups: conditions and constraints in a sociotechnical perspective," International Journal of Manpower, 1998.*

(Continued)

*Primary Examiner*—Tariq R. Hafiz
*Assistant Examiner*—Catherine M Colón
(74) *Attorney, Agent, or Firm*—Foley & Lardner LLP

(57) ABSTRACT

A diagnostic tool and method for defining a personal profile for an individual collects work pattern data associated with the individual, correlates the work pattern data with work pattern characteristics of a plurality of predefined work pattern groups, and identifies a personal profile for the individual based on the correlation, the personal profile including the classification of the individual as a member of one of the work pattern groups. Based on the personal profile, a knowledge management solution for the individual may be recommended, inclusive of knowledge products and services.

44 Claims, 19 Drawing Sheets

U.S. PATENT DOCUMENTS

| | | |
|---|---|---|
| 5,847,971 A | 12/1998 | Ladner et al. ............... 364/512 |
| 5,848,393 A | 12/1998 | Goodridge et al. |
| 5,875,110 A | 2/1999 | Jacobs ................... 364/479.02 |
| 5,913,201 A | 6/1999 | Kocur ........................... 705/9 |
| 5,918,207 A | 6/1999 | McGovern et al. ............ 705/1 |
| 5,924,072 A * | 7/1999 | Havens .......................... 705/1 |
| 5,948,054 A | 9/1999 | Nielsen ...................... 709/200 |
| 5,974,392 A | 10/1999 | Endo ............................. 705/8 |
| 6,002,855 A | 12/1999 | Ladner et al. ......... 395/500.01 |
| 6,052,669 A | 4/2000 | Smith et al. .................. 705/26 |
| 6,070,143 A * | 5/2000 | Barney et al. ................. 705/8 |
| 6,167,383 A | 12/2000 | Henson |
| 6,236,994 B1 * | 5/2001 | Swartz et al. .................. 707/6 |
| 6,266,650 B1 | 7/2001 | Sugaya et al. ................ 705/27 |
| 6,275,812 B1 * | 8/2001 | Haq et al. ..................... 705/11 |
| 6,292,830 B1 * | 9/2001 | Taylor et al. ............... 709/224 |
| 6,334,110 B1 | 12/2001 | Walter et al. |
| 6,338,042 B1 * | 1/2002 | Paizis .......................... 705/11 |
| 6,349,327 B1 * | 2/2002 | Tang et al. ................. 709/205 |
| 6,411,936 B1 * | 6/2002 | Sanders ....................... 705/10 |

FOREIGN PATENT DOCUMENTS

| | | |
|---|---|---|
| JP | 09251491 A | 9/1997 |

OTHER PUBLICATIONS

Peg et al. "Link HR to Corporate Strategy," Personnel Journal, Apr. 1991.*

Oppenheim, Richard. "Employee evaluation software," Accounting Technology, Mar. 1995.*

Greiner, Lynn, "It's Software for your People," Computing Canada, vol. 24, No. 6, bearing a date designation of Feb. 16, 1998, p. 34.

PCT International Search Report for PCT/US00/22652, mailed on Nov. 20, 2002.

Frazelle et al, "Worker Participation in Office Space Planning and Design Process Pays Large Dividends," Industrial Engineering, vol. 16, No. 12, bearing a designation "Dec. 1984" (1 pg.).

"Too Much Togetherness," Managing Office Technology, vol. 43, No. 7, bearing a designation "Sep. 1998" (3 pgs.).

Amy McCleverty, "Ethnography", http://pages.cpsc.ucalgary.ca/~saul/681/1997/amy/ethnography.html, bearing a designation "Mar., 1997" (10 pgs.).

John Teresko, "R&D Serves Dual Purpose", Industry Week, bearing a designation "Aug. 21, 2000" (6 pgs.).

"Steelcase Introduces New Concept in Office Integration", Buildings; Cedar Rapids, bearing a designation "Copyright Stamats Communications, Inc. May 1998" (2 pgs.).

Phil Patton, "Planners Propose Domestication of Office Settings", Journal Record, Oklahoma City, bearing a designation "Copyright Dolan Media Sep. 5, 1992" (3 pgs.).

Tim Stevens, "Lessons from the Leading Edge", IndustryWeek.com, bearing a designation "Articles-Publication Date Jul. 19, 1999" (5 pgs.).

Regina Raiford, "Time Machines: Fast Forwarding Into the Future of Office Facilities," bearing a designation "Buildings Apr., 2002 Feature" (3 pgs.).

Britton Manasco, "Steelcase Designs the Intelligent Workspace", www.webcom.com/quantera/Steelcase.html, bearing a designation "Originally appeared in the Aug. 1996 issue of Knowledge Inc" (3 pgs.).

Daniel Welton, Abstract for "Caves and Commons Case Study Evaluation of a Workplace Strategy for Improving Team Effectiveness", bearing a designation "Copyright 1996 Work & Family Connection, Inc." (1 pg.).

Humphries, A. W., "Designing a functional reference desk: planning to completion", RQ, v33, n1, p. 35, bearing a designation "Fall, 1993".

"Global Knowledge Network Begins Training 1,000 Omnitel Employees Over Corporate Intranet," PR Newswire (Feb. 16, 1999).

* cited by examiner

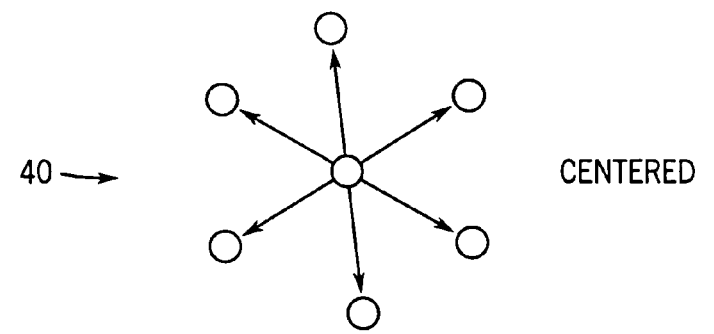
CENTERED
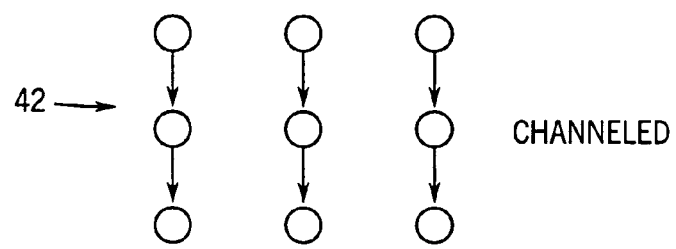
CHANNELED
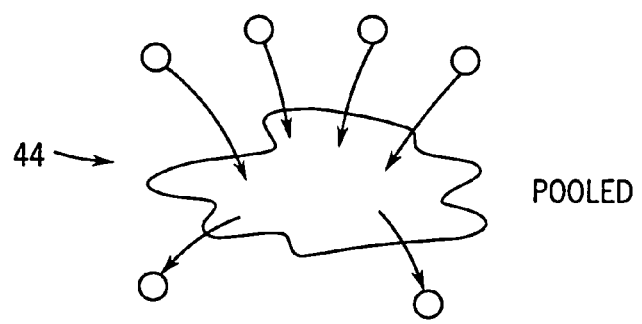
POOLED
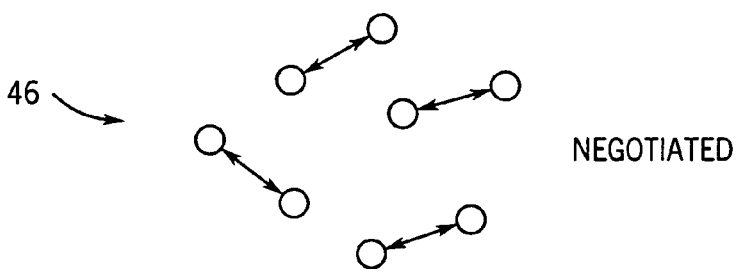
NEGOTIATED
FIG. 4

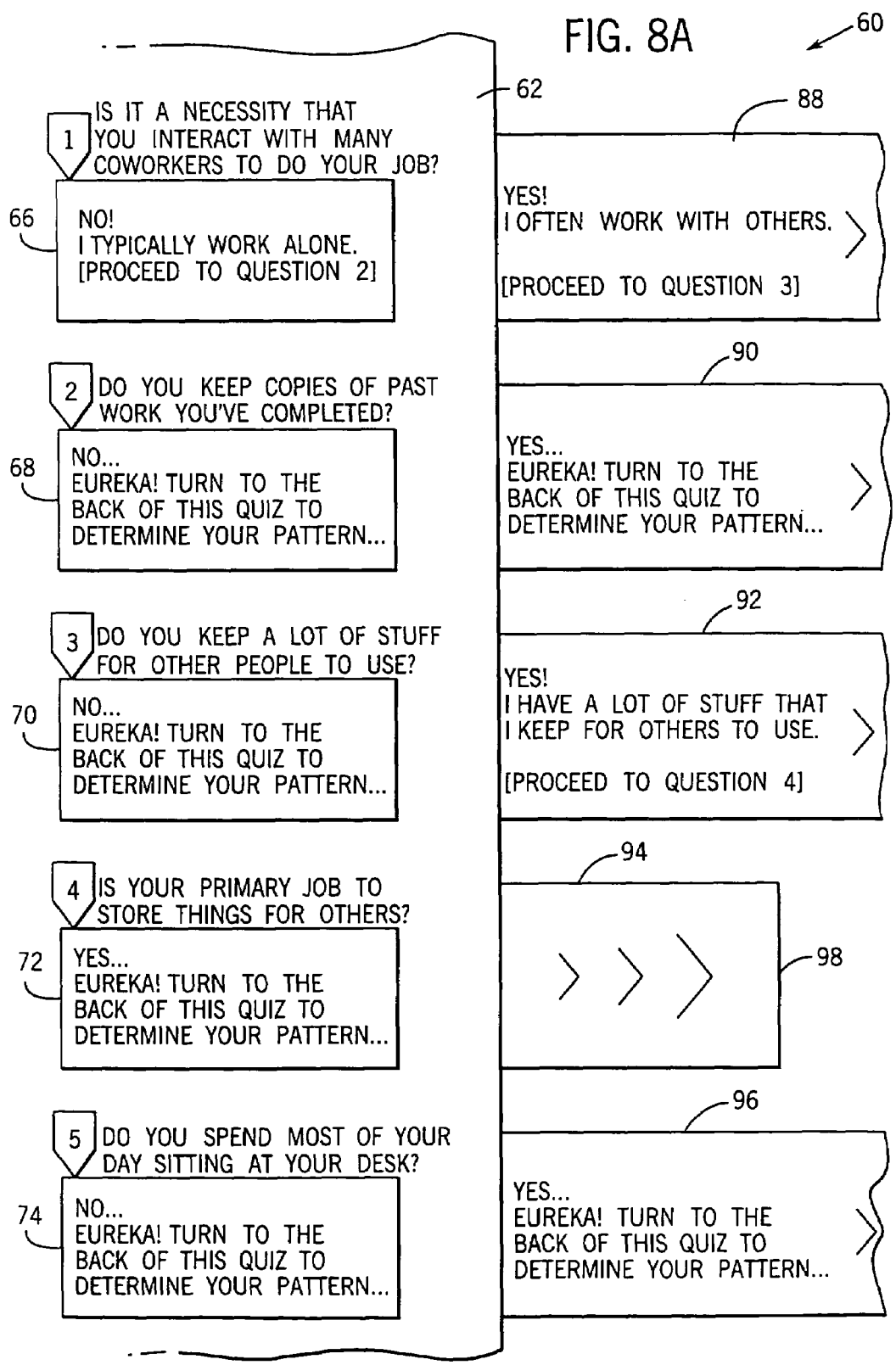

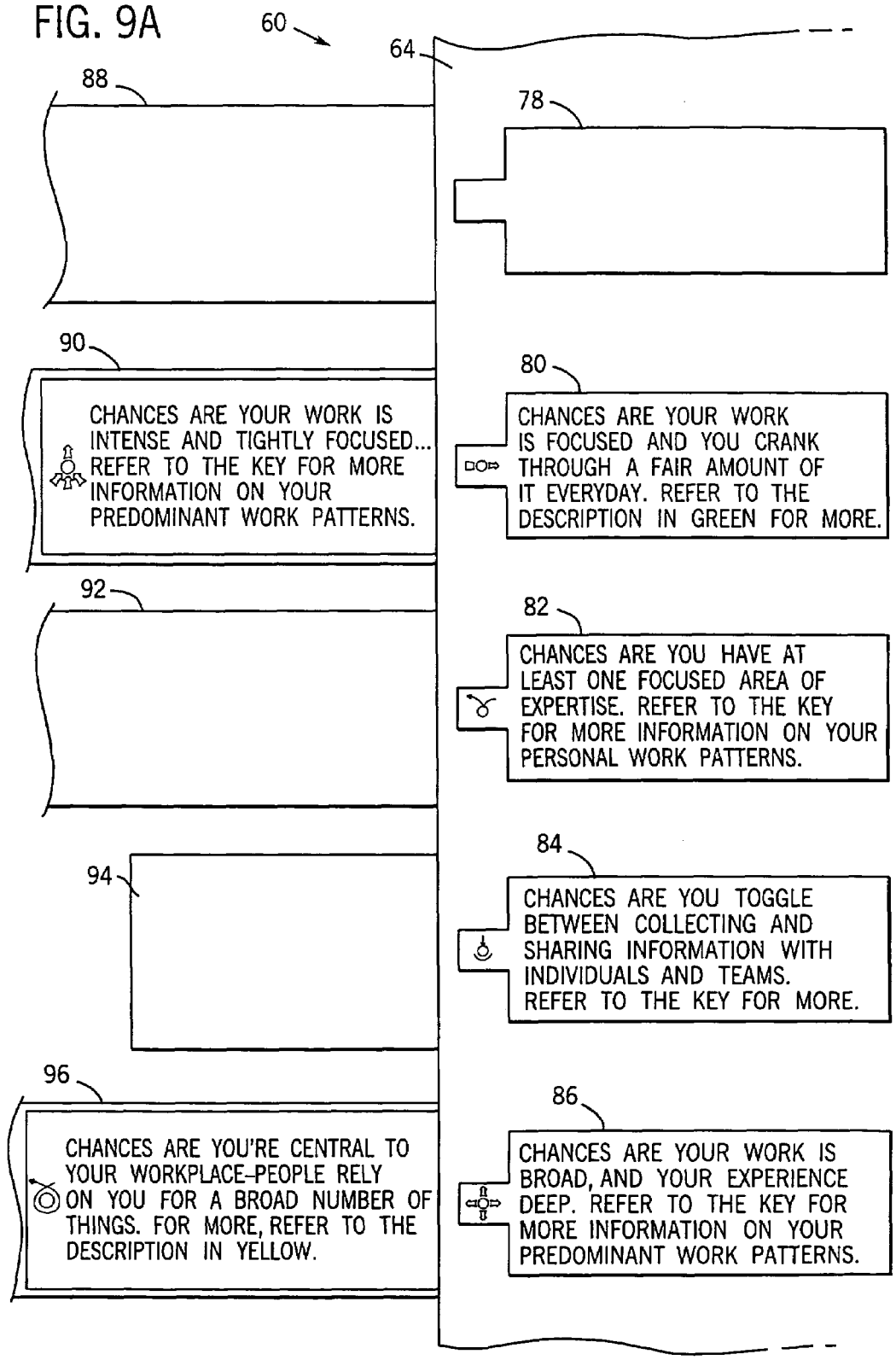

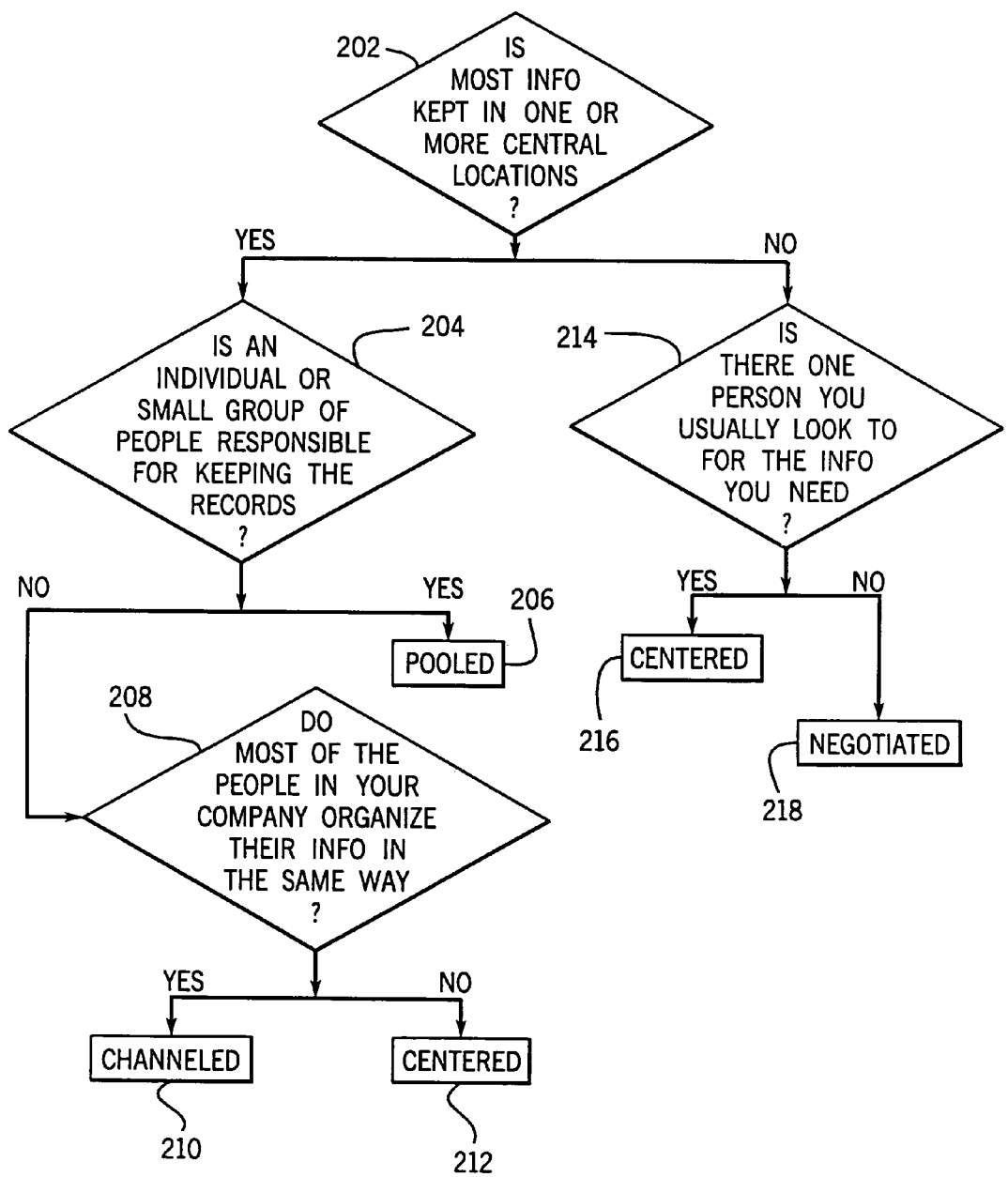

SYSTEM AND METHOD OF DETERMINING A KNOWLEDGE MANAGEMENT SOLUTION

CROSS-REFERENCE TO RELATED APPLICATIONS

The present application is related to application Ser. No. 09/382,139, entitled "System and Method of Providing a Knowledge Management Solution," filed on Aug. 24, 1999.

FIELD OF THE INVENTION

The present invention relates generally to the design of knowledge management systems and, in particular, to a diagnostic tool and method for defining a personal profile for an individual based on the individual's work pattern characteristics, and prescribing a knowledge management solution for the individual based on the personal profile.

BACKGROUND

Individuals in a work organization are confronted daily with the need to organize and manage the vast amount and varied types of information that flow across their desks. Knowledge management entails the organization and apt handling of such information flow to enhance productivity, both on the individual level and for the work organization as a whole. Thus, knowledge management systems address collecting, selecting and sharing information in multiple forms so that work can be done more effectively. A well-designed knowledge management system should help individuals find what they need, identify useful information, share useful information, codify information, and enable effective use of information collections.

Current design methods for knowledge management systems for a work organization generally follow an ad-hoc approach. That is, knowledge management systems often are relegated to the space that is left over after the layout for workstations or office furniture has been determined. Further, current knowledge management systems, if they exist at all, ignore individual needs, which may be influenced by the individual's work role in the organization, the particular type of organization in which he works, or his own personality. Consequently, the organization and storage of valuable knowledge tends to be random, with individually designed knowledge management systems being incompatible with other systems in the office environment, creating barriers to the sharing of knowledge and the harvesting of knowledge from individuals' collections. Also, due to the lack of knowledge management planning, workers often are provided knowledge management tools either that are not particularly well-suited for the worker's role or that are unaccompanied by instructions on how to most effectively use the tools. Such shortcomings introduce worker inefficiency and, thus, contribute unnecessarily to increased costs.

Although individuals work in different work environments and face different challenges and despite the seemingly random nature of their information collections, the ways in which individuals collect, select and share information inevitably falls within a finite number of knowledge flow patterns. Use of these identifiable, predictable patterns lends itself to facilitating the design of knowledge management systems that are tailored for the individual and yet that include a degree of cohesiveness such that knowledge may easily be harvested from individual collections and shared among individuals in a work organization.

Further, it would be advantageous to facilitate the design of such knowledge management systems by the use of a simple, interactive diagnostic tool that is based on the discovered knowledge flow patterns. Both the diagnostic tool and the resulting knowledge management system should be easy to use by the individual worker. Also, it would be desirable for the diagnostic tool to continually recommend updates for the knowledge management system, thus ensuring that the knowledge management system adapts to both changes in the individual's work role and technological advances in knowledge management products and practices. Because the resulting systems will be tailored for the individual, the individual's productivity will be enhanced. And, because the resulting individual systems will include compatible components, sharing knowledge among individuals and collecting knowledge from individuals will be facilitated.

The ease of use of the diagnostic tool and the knowledge management systems, the realization of immediate benefits, and the adaptability of the knowledge management systems to individual and technological changes, will ensure continued use of both the diagnostic tool and the resulting knowledge management systems. Consequently, the diagnostic tool and knowledge management systems will become ingrained in the organization's work culture and thus will continue to provide long-term benefits.

SUMMARY OF THE INVENTION

The present invention features a diagnostic tool for classifying an individual based on work pattern data associated with the individual. The tool includes a plurality of work pattern groups, each work pattern group being defined by a plurality of work pattern characteristics. The tool further includes an interface and a diagnostic engine. The interface allows input of work pattern data associated with the individual. The diagnostic engine correlates the work pattern data with the work pattern characteristics of each work pattern group and classifies the individual as a member of at least one of the work pattern groups based on the correlation.

The present invention also features a system for prescribing a knowledge management solution for an individual. The system includes a diagnostic tool, an interface coupled to the diagnostic tool, a plurality of work pattern groups, and a prescription tool. Work pattern data associated with the individual is input to the diagnostic tool via the interface. The diagnostic tool correlates the work pattern data with the work pattern groups and then defines a personal profile for the individual based on the correlation. The prescription tool prescribes a knowledge management solution based on the personal profile.

The present invention also features a method for classifying an individual as a member of at least one of a plurality of work pattern groups. The work pattern groups include a Processor group, a Keeper group, a Concierge group, a Broker group, a Player group, and a Specialist group, each of which is defined by work pattern characteristics. A work characteristic associated with the individual is measured and the individual is identified as a member of at least one of the work pattern groups based on the measured work characteristic.

BRIEF DESCRIPTION OF THE DRAWINGS

The invention will hereafter be described with reference to the accompanying drawings, wherein like reference numerals denote like elements, and:

FIG. 4 is a diagram illustrating a plurality of organizational information flow models representing the typical ways in which information is channeled in different types of work organizations;

FIG. 8A is a close-up view of exemplary text printed on the tabs and visible through the apertures in the front view of the diagnostic tool of FIG. 8;

FIG. 9A is a close-up view of exemplary text printed on the back sides of the tabs and visible through the apertures as could be seen in the view illustrated in FIG. 9;

FIG. 10 is a flow chart of a method for determining work organization types that may be implemented by a preferred embodiment of the diagnostic tool;

DETAILED DESCRIPTION OF EXEMPLARY EMBODIMENTS

Individuals within a work organization (i.e., a company or a team or department within the company) tend to collect, store and share knowledge in defined, predictable patterns. By identifying these stable work patterns and the work pattern characteristics that define each pattern, knowledge management solutions can be easily prescribed for individuals within the work organization. Such knowledge management solutions encompass both management methods and tools, physical and digital, ranging anywhere from tips for collecting, managing and sharing knowledge (e.g., how to arrange a workspace, how to organize a computer desktop, etc.) to knowledge management consulting services to knowledge management products, including, for example, labels and labeling systems, binders, tracking devices, reminder devices, personal information management tools, time management tools, schedulers, and furniture, white boards, file cabinets, trays, bins, and other storage products.

The present invention relates to a method and diagnostic tool that uses these identified stable patterns to classify individuals within a work organization into one or more defined work pattern groups. The diagnostic tool performs the classification by correlating work pattern data associated with the individual's work activity with the work pattern characteristics that define each of the work pattern groups. Based on the classification, a knowledge management solution may be prescribed for the individual. Further, the classification method implemented by the diagnostic tool enables a common thread to underlie the knowledge management systems used by all the individuals in the work organization, thus facilitating harvesting and sharing of information within the organization.

Figure 1:
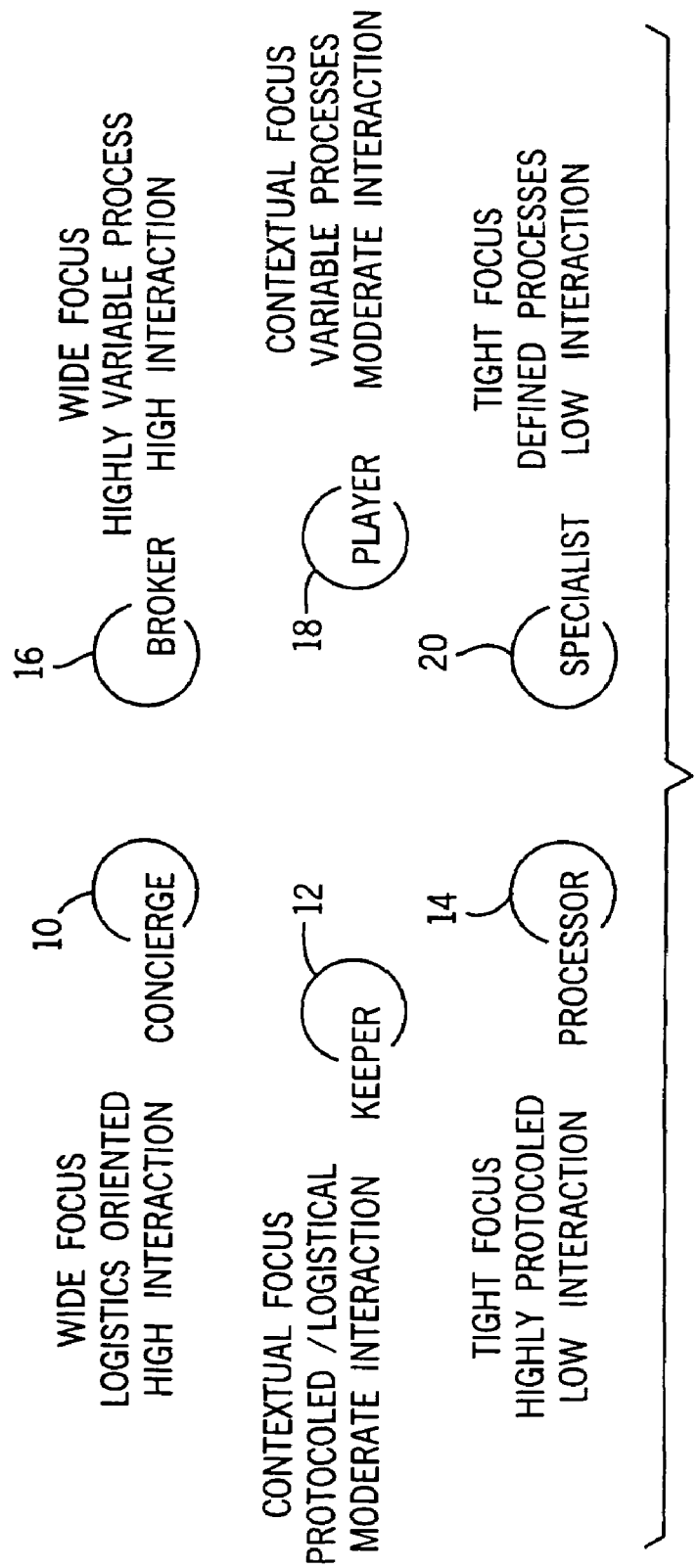
FIG. 1 is a diagram illustrating six work pattern groups and their associated work pattern characteristics in accordance with the invention.

While a vast number of variables affect how individuals organize their work, a small number of work pattern characteristics have an overriding effect. Identification of these characteristics has led to the establishment of at least six work pattern groups into which most individuals of a work organization may be classified. These six work pattern groups and their associated work pattern characteristics are illustrated in FIG. 1 and have been labeled as a Concierge 10, a Keeper 12, a Processor 14, a Broker 16, a Player 18, and a Specialist 20. These labels have been found useful for descriptive purposes, and have no bearing on the actual position, role or status that an individual may have in a work organization. Rather, the work pattern groups, and their descriptive labels, are defined solely by the underlying work pattern characteristics that are common to individuals who fit within (i.e., are members of) each particular group.

These work pattern characteristics include both primary work pattern characteristics, which have the greatest influence on defining the work patterns groups, and secondary work pattern characteristics, which influence the work pattern group definitions to a lesser degree. For example, the primary work pattern characteristics may include the scope of the individual's work within the work organization (e.g., how wide or narrow the work focus is); the degree to which the individual's work is based on well-defined processes, procedures or protocol; the amount of interaction the individual has with other individuals; and whether the individual's work is content-based or logistics-oriented (i.e., managing the operational details of some aspect or activity of the work organization).

Secondary work pattern characteristics, which influence the definition of the work pattern groups to a lesser degree, may include the number of focuses (e.g., projects) the individual's work encompasses, the type of information the individual uses (e.g., fabric swatches, blueprints, purchase order forms, etc.), the degree of mobility required of the individual in performing his work (i.e., whether the individual stays at his assigned workstation for the majority of the day), and the individual's relationship to the information he uses (e.g., whether the individual acts as a filter of the information, whether the individual is a curator of the information, etc.).

Each of the six work pattern groups 10–20 illustrated in FIG. 1 have the following defining work pattern characteristics:

1) The Concierge group 10

The Concierge is the person who is often responsible for the smooth running of a company or department, providing services that enable others to work better. Examples of members of the Concierge work pattern group include an Executive Assistant and a Director of Client Services.

The work pattern characteristics associated with the Concierge work pattern group include a wide focus, logistics-oriented work, and a high degree of interaction with others. The Concierge typically has multiple tasks ongoing simultaneously and has a wide aperture of information exposure. The shape of the Concierge's work day is unpredictable; she must be responsive to requests and situations and immediate and short-term concerns. The Concierge must be highly accessible to others and typically acts as a liaison between other workers and the external world.

2) The Keeper group 12

Keepers are responsible for the maintenance and access of records, documents, objects or information. They are often responsible for managing a system inherited from a predecessor. Examples of members of the Keeper work pattern group include a librarian and a tape archivist.

The work pattern characteristics associated with the Keeper work pattern group include a contextual focus, adherence to protocols and procedures governing performance of the work, logistics-oriented processes, and a moderate degree of interaction with others. The Keeper's work is focused by the type of information collections that the Keeper manages, and the Keeper has a narrow aperture of information exposure. The shape of the Keeper's day is unpredictable. He must be responsive to requests and situations and is more concerned with the category of information that he manages rather than the actual content. The Keeper may also participate in the creation of logistical systems for managing knowledge collections. The Keeper communicates with people who require the Keeper's assistance or service. He operates from a fixed work setting, and he suffers a high rate of interruptions, especially from Brokers, Players and Specialists.

3) The Processor group 14

Processors perform predefined tasks on a continuous flow of information. Their work usually has a predictable set of inputs and outcomes. An example of a member of the Processor work pattern group is an order entry worker.

The work pattern characteristics associated with the Processor work pattern group include a narrow work focus, performance of highly protocoled processes, and low interaction with others. The Processor's work typically is focused on performing a portion of a process, such as entering orders, and thus the processor works with information that is highly filtered. The Processor's work consists mostly of fulfilling procedural requirements and is the closest to pure task work of all the work pattern groups. The Processor usually works alone in a fixed work setting.

4) The Broker group 16

The Broker helps to direct information to those who need it most. An example of a member of the Broker work pattern group is an individual at the managerial or strategic level of a work organization.

The work pattern characteristics associated with the Broker work pattern group include a broad work focus, work activities that follow highly variable and unstructured processes, and a high degree of interaction with others. The Broker must deal with many projects at the same time, and thus has multiple work foci and must deal with a heavy flow of information. Because of the Broker's knowledge and experience, the Broker often is a filter of this information flow. As a filter, it is the Broker's responsibility to assess what information needs to be disseminated to the rest of the organization and to facilitate the dissemination of the information. It is also the Broker's responsibility to act as an advisor or as a liaison between levels of personnel or between personnel and clients. The Broker's high degree of interaction requires that he must manage his need to be accessible to others against his need for individual work time. The Broker's work requires a high degree of mobility both within and outside of the work organization.

5) The Player group 18

The Player brings specific skills and disciplinary knowledge to a team. Incoming information is often filtered through other team members. The Player generally has a strong emotional and professional connection to her job. An example of a member of the Player work pattern group is an architect.

Work pattern characteristics associated with the Player work pattern group include work that is constantly changing and, thus, is contextually focused (i.e., the work is focused by the project or situation), work that must adapt to and follow variable processes, and a moderate degree of interaction with others. The Player often fluctuates between team work and individual work and is mobile between a small number of work settings.

6) The Specialist group 20

The fruits of the Specialist's labor are often used by a team. Specialists tend to be shielded from outside distractions, allowing them to spend as much uninterrupted time as possible on core work. An example of a member of the Specialist work pattern group is a key animator.

Work pattern characteristics associated with the Specialist include work that is tightly focused on a narrow portion of a project or domain, highly specialized and defined processes, and a low degree of interaction with others.

Figure 2:
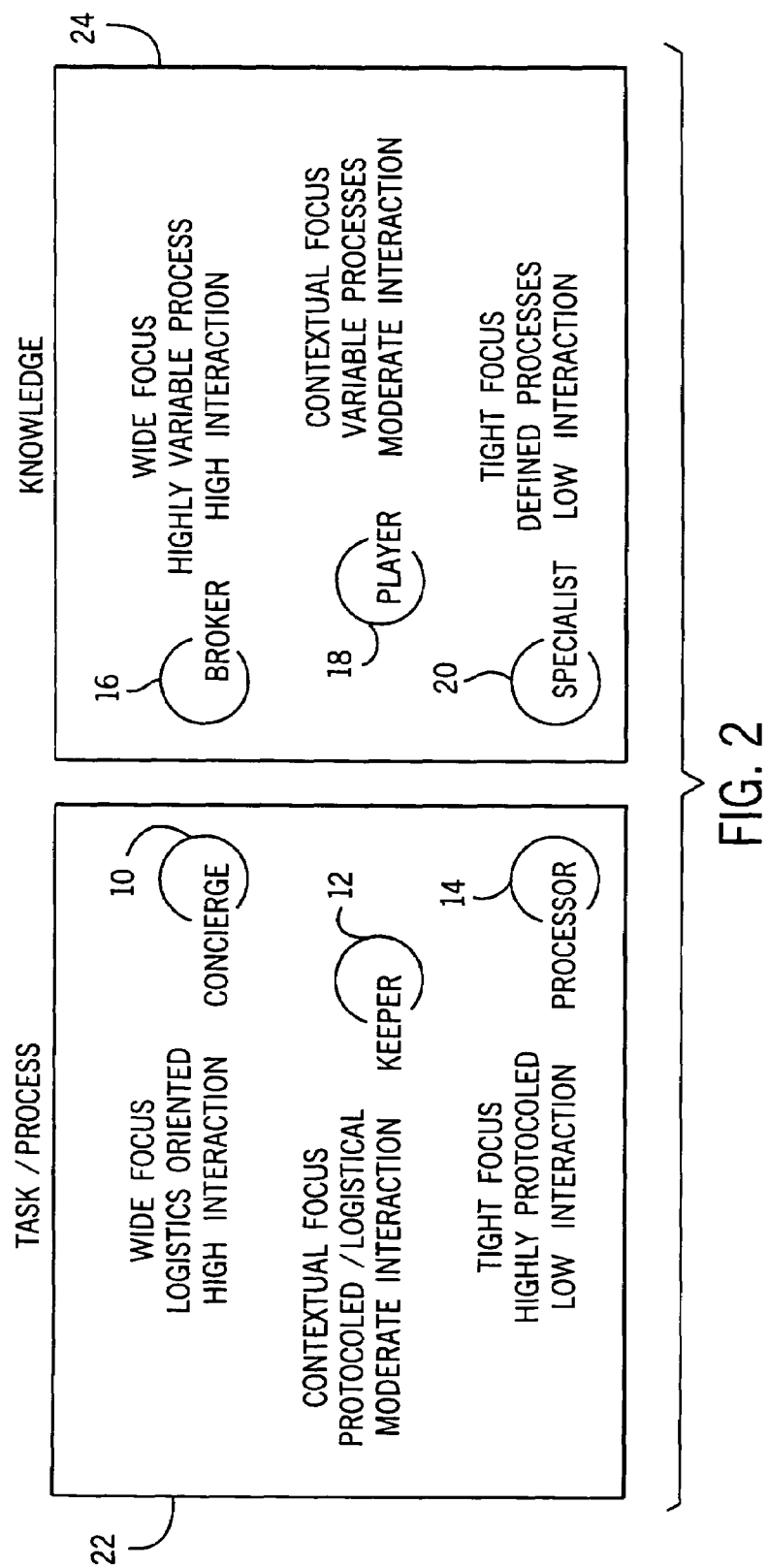
FIG. 2 is a diagram illustrating an alternative exemplary classification of individuals into work pattern groups in which the work pattern groups of FIG. 1 are divided into two categories of groups, the first category including task or process workers and the second category including knowledge workers.

The division of individuals into work pattern groups may be accomplished in ways other than the six groups 10–20 described above. For example, referring to FIG. 2, it can be seen that individuals may be placed in two macro groups that are defined by other types of work pattern characteristics than those described above: A first group 22 encompasses individuals whose primary responsibilities involve task or process-related work. A second group 24 encompasses individuals whose primary responsibilities involve knowledge-based work. Thus, on a very basic level, the diagnostic tool may simply classify the individual as a member of either the task/process worker group 22 or the knowledge worker group 24. As illustrated in FIG. 2, individuals who are members of either the Concierge group 10, the Keeper group 12, or the Process group 14 are also primarily task or process workers. Similarly, individuals who are members of either the Broker group 16, the Player group 18, or the Specialist group 20 are also primarily knowledge workers. It should be understood, however, that the division of groups 10–20 into macro groups 22 and 24 is not static and that a member of group 10, for example, which is illustrated as a sub-component of task/process group 22, may also, at times, exhibit a work pattern that is characteristic of knowledge group 24. FIG. 2 represents an exemplary alternative classification system only and is not intended to be limiting to the invention.

Figure 3:
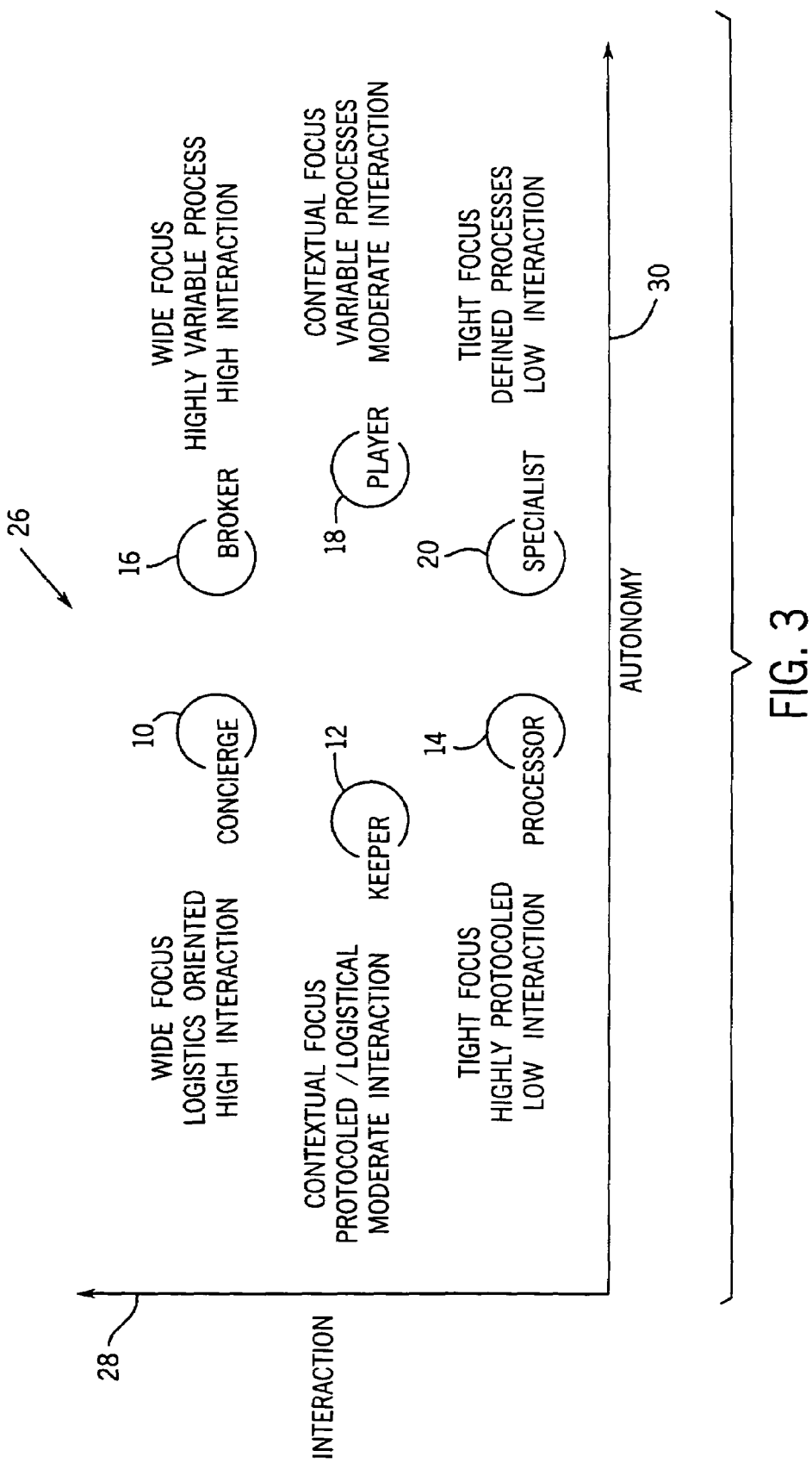
FIG. 3 is a diagram illustrating an alternative exemplary classification of individuals into work pattern groups in which the plurality of work pattern groups of FIG. 1 are placed on a graph having a vertical axis corresponding to a degree of interaction and a horizontal axis corresponding to a degree of autonomy.

Another exemplary alternative classification system is illustrated in FIG. 3, which results from the examination of other types of work pattern characteristics. In FIG. 3, it can be seen that the six groups 10–20 or the two groups 22, 24 may mapped on a graph 26 having a vertical axis 28 that represents a degree of interaction with others and a horizontal axis 30 that represents a degree of autonomy within the work organization. Thus, an individual may be classified as a member of a work pattern group based on the individual's degree of interaction and the individual's degree of autonomy within the work organization. Consequently, this graphical mapping may lead to the establishment of work pattern groups other than, or in addition to, the six groups 10–20 or the two groups 22, 24 described above.

Although groups 10 to 20 represent a preferred classification system it should be understood that additional or alternative work pattern groups can be developed, each of which is defined by a set of underlying work pattern characteristics. Thus, the particular classifications or groups used is not particularly important. The classification of individuals into particular work pattern groups instead is useful because, in addition to having common work pattern characteristics, members of a particular work pattern group also tend to use the same type of knowledge collections. Accordingly, a prescription of a knowledge management solution for an individual can be facilitated based upon a correlation between the defining work pattern characteristics of members of a particular work pattern group and the type of knowledge collections typically used by individuals exhibiting such characteristics.

Knowledge collections are groups of related information and objects that are created, maintained and used by individuals as well as teams of individuals, and can be physical or digital. The knowledge collections, which are dispersed throughout individual workspaces and throughout the organization, tell people what they have, what they have accomplished, and what they have to do. While the content of knowledge collections is highly idiosyncratic, the organization and dynamics of collections are patterned.

A knowledge collection begins when information or objects are perceived to have an ongoing importance or when new information patterns are perceived. Over time, new items are integrated into collections while other items are weeded out. Pieces of collections are removed to be worked on and then returned, discarded or entered into a different collection. As collections grow, an organizational scheme may emerge which could start simply and become more complex and/or move from accidental organization to planned organization. Some collections eventually reach a state of closure such as a complete project. At this time, the collection may remain intact and be placed in a private, group or enterprise-level archive, it might be dismantled, or perhaps may remain in close proximity for frequent reference.

Most knowledge collections fall into one of four macro categories: a core work category, a reference category, a job support category, and a life support category.

1) Core work collections are created in the course of an individual's primary work and are often dispersed throughout the work organization. Such collections are often categorized by theme and are internally organized by chronology. Exemplary core work collections include project proposals and invoices.

2) Reference collections support core work and, like core work collections, the content of reference collections varies widely. Reference collections are often categorized by type or theme and include such materials as dictionaries and product catalogs.

3) Job support collections consist of the tools and information that support a person's work, but are not the focus of the work itself. Job support collections tend to be categorized by either type or chronology and include, for example, an employee handbook, a stapler, and reminders such as POST-IT notes.

4) Life support collections support basic human functions and life activities, such as a coat, gym bag, snacks, and aspirin.

Although specific examples have been given of types of information or objects in collection categories, the same type of information or objects may fall into any one of the categories. This result occurs because individuals may use the same objects or information in different manners or for different purposes.

Knowledge collections appear in three primary states as they move through the work process: active, anticipated and archived. An active collection includes work that is in progress (e.g., information and objects that are currently being used or created). An anticipated collection includes frequently used reference materials or work that is waiting to be done in the near future. An archived collection includes references that are used less frequently and completed or closed work projects. Thus, a state merely describes the collection's relevance to its user at any particular moment. As such, collections may continuously move from one state to another. The state of a collection has a relationship to the collection's location within the individual's work space or the work organization and thus has a bearing on the design of the knowledge management system.

The realization that members of a particular work pattern group tend to use the same type of knowledge collections and that their common types of knowledge collections appear in similar states facilitates deriving a prescription for a knowledge management solution tailored for the individual.

For example, members of the Concierge work pattern group 10 need to keep knowledge collections that support others' work and, thus, are often curators of both private and shared information resources. Concierges require quick access to a wide variety of knowledge collections, including active collections, anticipated collections, and archived collections.

Members of the Keeper work pattern group 12 are curators of shared resources and manage both incoming requests and incoming information for knowledge collections. Keepers extensively use reference and archived information and require highly formal indexing systems to support information retrieval. The needs of a Keeper's workspace will relate directly to the type of information that the Keeper manages.

Members of the Processor work pattern group 14 keep knowledge collections that typically represent work in progress (i.e., active collections) and work to be performed in the immediate future and supporting reference materials (i.e., shallow anticipated collections). Archived collections often are stored outside of a Processor's workspace. A Processor usually has no need to keep work once the work procedure is completed.

Members of the Broker work pattern group 16 usually have information collections that consist of varied types of anticipated information and trophies (e.g., an exemplary document, a memento or souvenir from a completed project, etc.) of past work.

The complexity of the work of a member of the Player work pattern group 18 requires the management of a large number of anticipated information collections, personal archive materials, and professional references. A Player often stores project information, the results of the Player's own work, and items the Player perceives to be useful later in her career. The Player also is a heavy user of shared knowledge collections.

Members of the Specialist work pattern group 20 keep knowledge collections that typically include active and shallow anticipated collections, professional references, and personal archival information, including trophies of exemplary past work.

The prescribed knowledge management solution may be further refined by taking into consideration factors other than the classification of the individual as a member of a work pattern group and realizing that members of a particular group tend to use similar types of knowledge collections. Such factors include, for example, the type of work organization in which the individual works and the personal knowledge management style of the individual. Each of these factors will be described below.

Work organization types relate to the manner in which information flows between individuals in a work organization. Information flow generally follows one of four basic models which can apply to a small, homogenous firm (e.g., an ad agency) or a group, department or team within a large firm (e.g., a development group at a car company). The four basic organizational information flow models include a Centered model 40, a Channeled model 42, a Pooled model 44, and a Negotiated model 46. Pictorial illustrations of models 40–46 are shown in FIG. 4. Again, these descriptive labels are used for convenience only. The models themselves are defined by the information flow characteristics which will be described below and, thus, other descriptive labels may be used.

In the Centered model 40, information flows between a central person (e.g., a Broker) and surrounding individuals. The central person has little need to retain information collections that contain examples of work, sources of information and proof supporting work. Surrounding individuals must keep these information collections. Knowledge management is embodied by the central person's syntheses of work. An example of a Centered work organization is a small start-up firm in which everyone looks to the founder for direction.

In the Channeled model 42, information flows and accumulates according to explicit rules through defined channels. Most individuals make predictable hand-offs of information. The system has identified key individuals for extracting and retaining knowledge. Knowledge management often involves tracking and retaining work in progress. An example of a Channeled work organization is a claims processing unit at an insurance company.

In the Pooled model 44, individuals contribute to and draw from a common information pool that all can access. Knowledge management often demands a curator search the pool and formalize useful elements to make them usable long after the immediate work context ceases to exist. An example of a Negotiated work organization is a high-tech research lab.

In the Negotiated model 46, individuals create and trade information on an ad hoc personalized basis. Each individual must keep their own knowledge collections. Knowledge management often depends on mapping out the individuals that have particular expertise and experience. An example of a Pooled work organization is a project team at a management consultancy.

Taking account of personal styles also helps refine the knowledge management solution prescribed for a particular individual. Individuals tailor their work spaces and processes in many ways. Some people have a cognitive need to keep their work visible in order to mentally organize their time and tasks. Other people have just as great a need to put things out of sight in order to mentally organize their time and tasks. Thus, there are two different cognitive models for organization: one that relies on the visible spatial relationships between objects and one that relies upon prefabricated categories (alphabetical, calendrical, numerical, etc.). Knowing the personal style preferred by an individual will ensure that the knowledge management solution is tailored for the individual, thus creating a better chance that the individual will use and realize long-term benefits from the solution.

Thus, the diagnostic tool may simply classify the individual as a member of one or more work pattern groups or may advantageously develop a personal profile of the individual that includes the individual's work pattern group classification, an identification of the type of organization in which the individual works, and a recognition of the individual's personal knowledge management style. The classification or personal profile developed by the diagnostic tool may then be used to prescribe a knowledge management solution for the individual. As discussed above, the realization that members of a particular work pattern group require and use similar types of knowledge collections facilitates the prescription of a knowledge management solution. This solution may be refined from other information contained in the individual's personal profile, such as the type of organization in which the individual works and the individual's personal knowledge management style. The prescribed solution may offer a variety of knowledge management products (e.g., storage products) from which the individual may choose, suggest knowledge management methods, and provide advice on how to make the most effective use of particular knowledge management products or methods.

Figure 5:
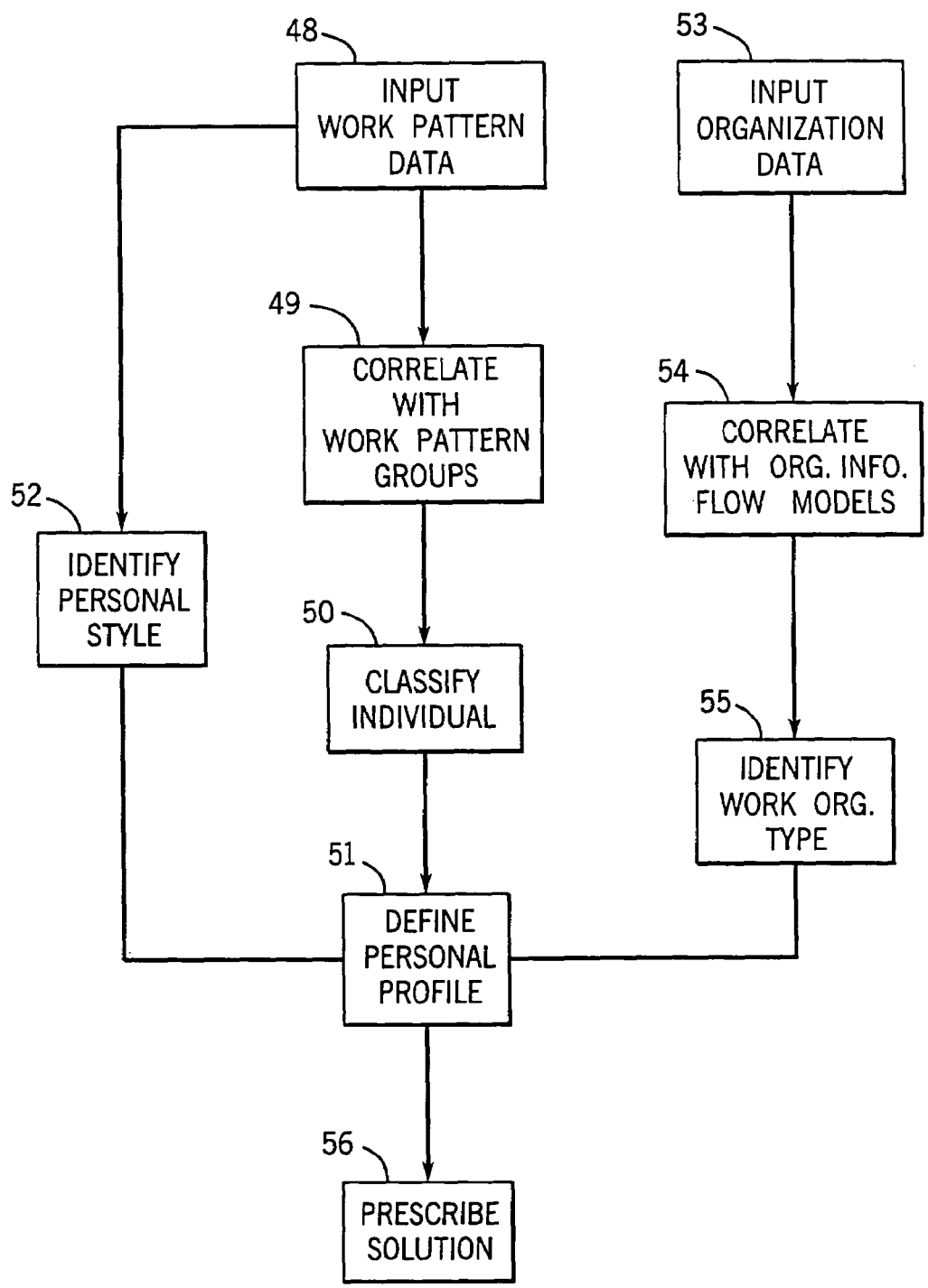
FIG. 5 is a flow chart illustrating the steps of the method used to classify individuals as members of at least one of the work pattern groups shown in FIG. 1.
Figure 6:
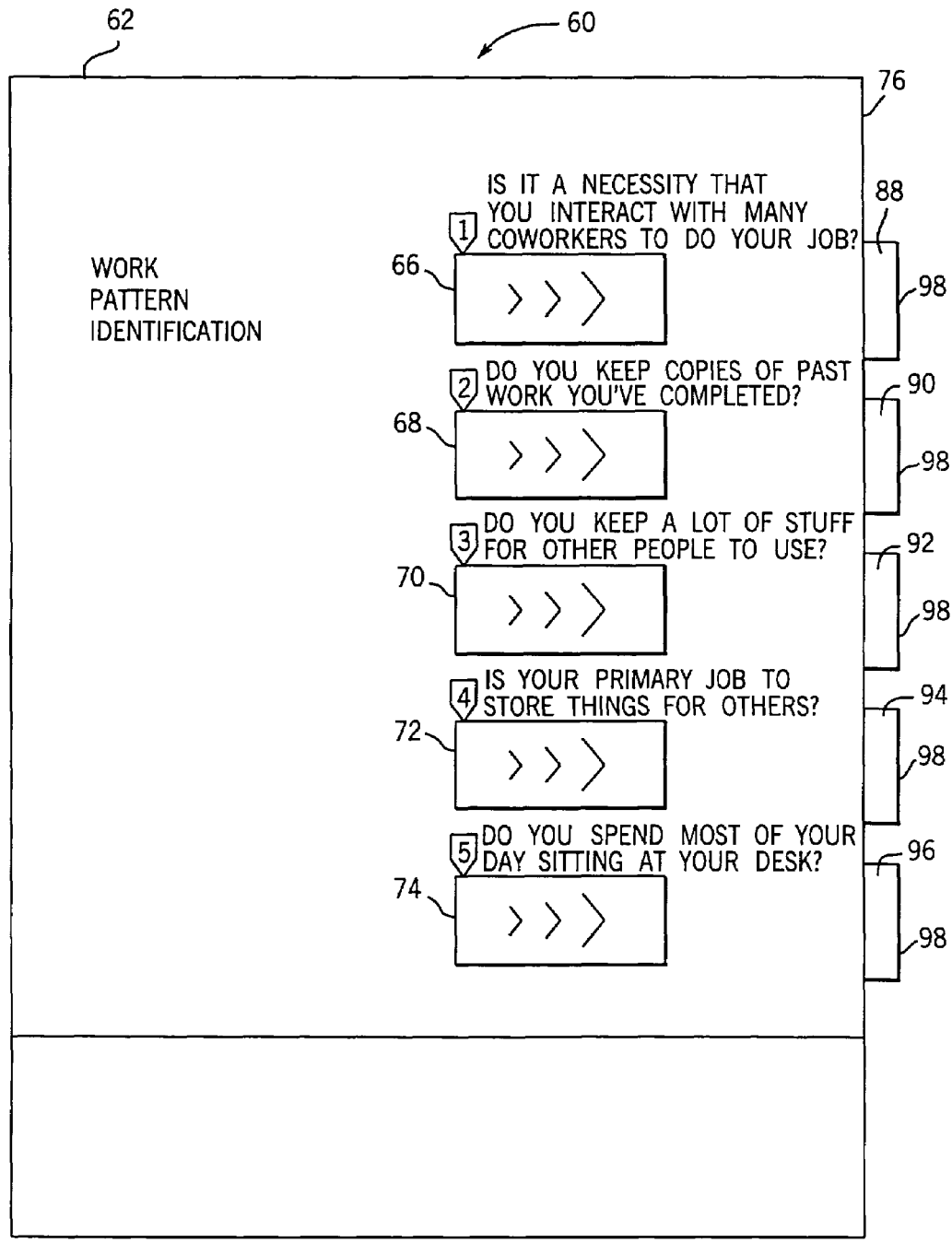
FIG. 6 is a front view of an embodiment of a diagnostic tool which implements the steps of the method of FIG. 5.
Figure 7:
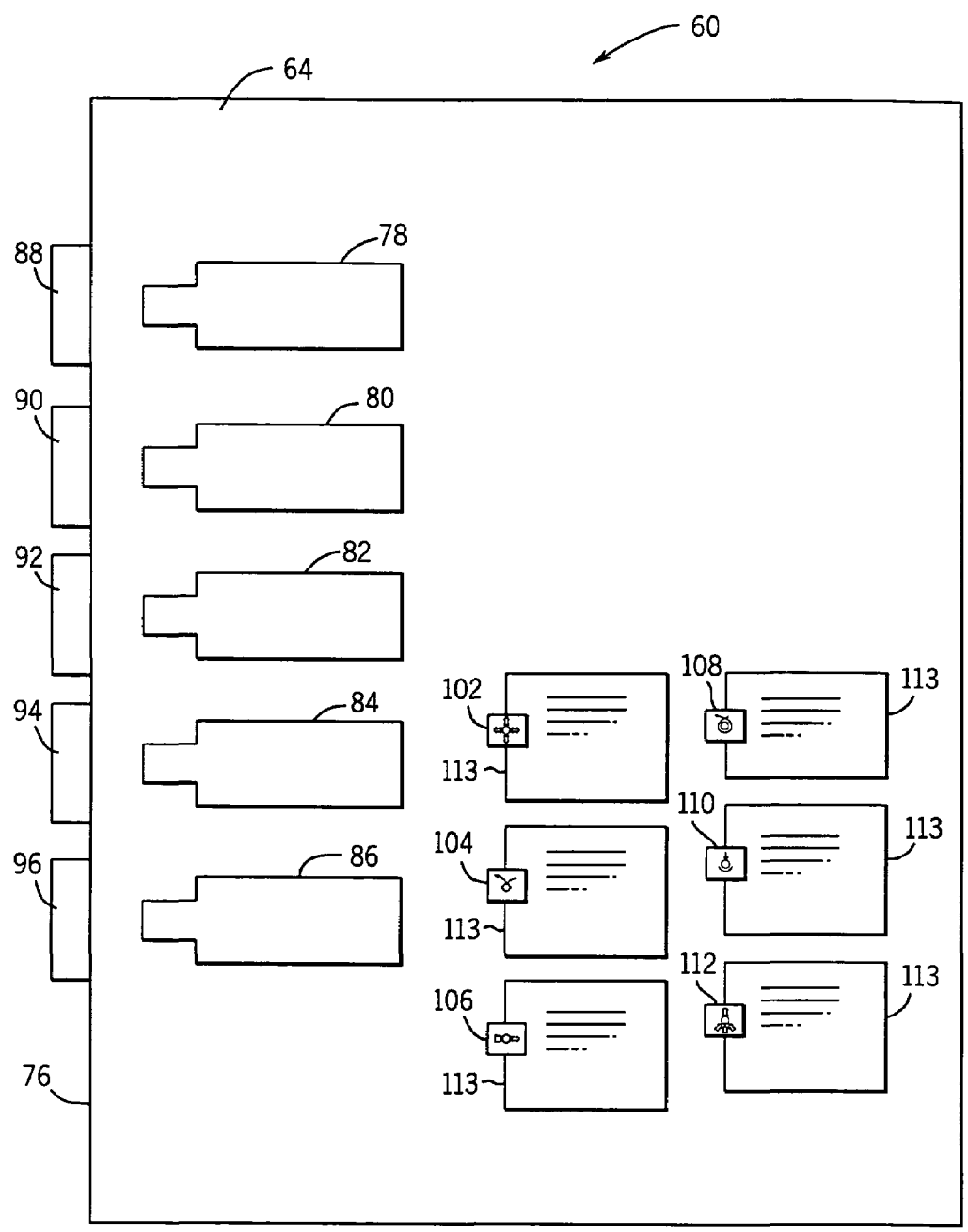
FIG. 7 is a back view of the diagnostic tool of FIG. 6.
Figure 7A:
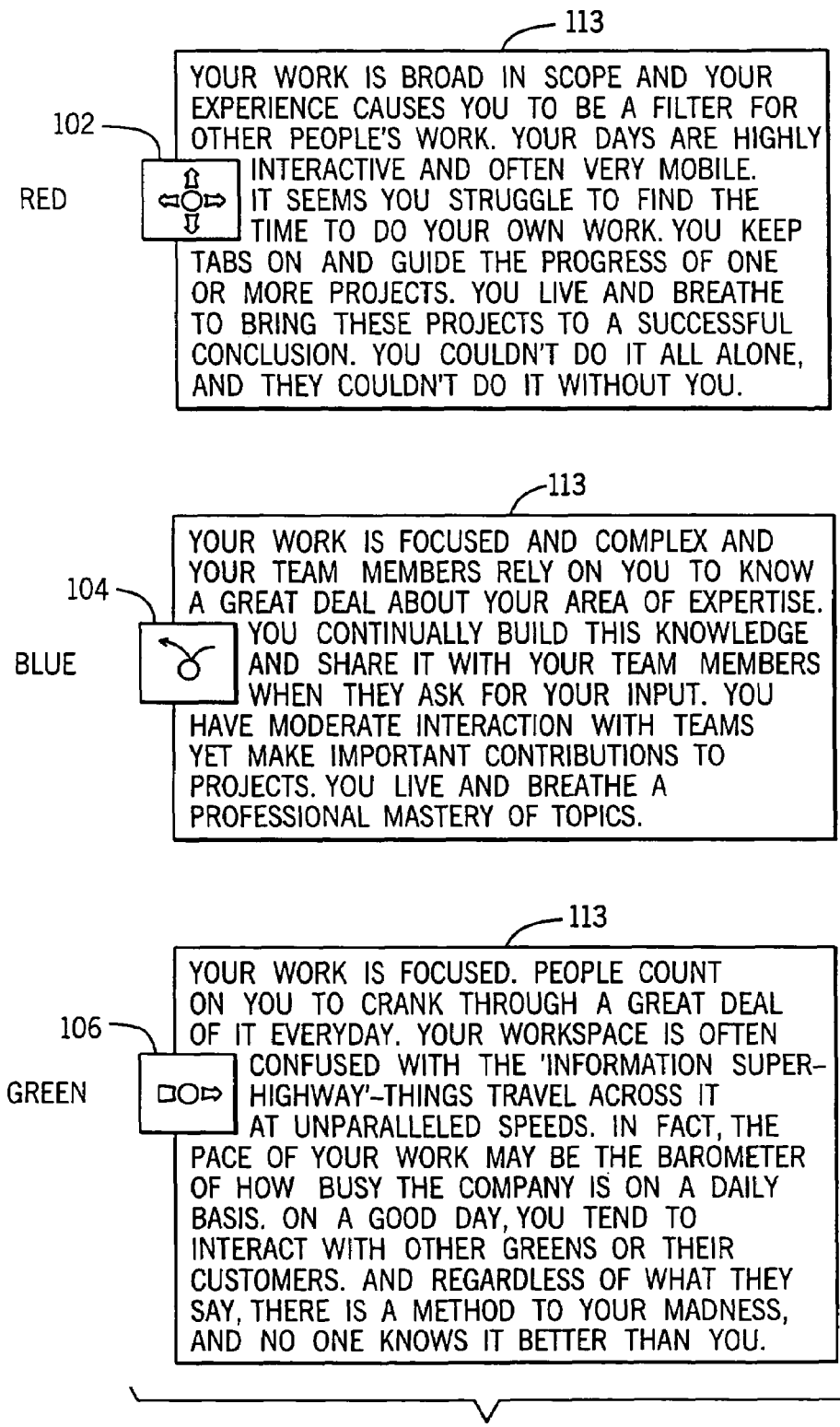
FIGS. 7A and 7B are close-up views of exemplary text printed on the back side of the diagnostic tool as shown in FIG. 7.
Figure 7B:
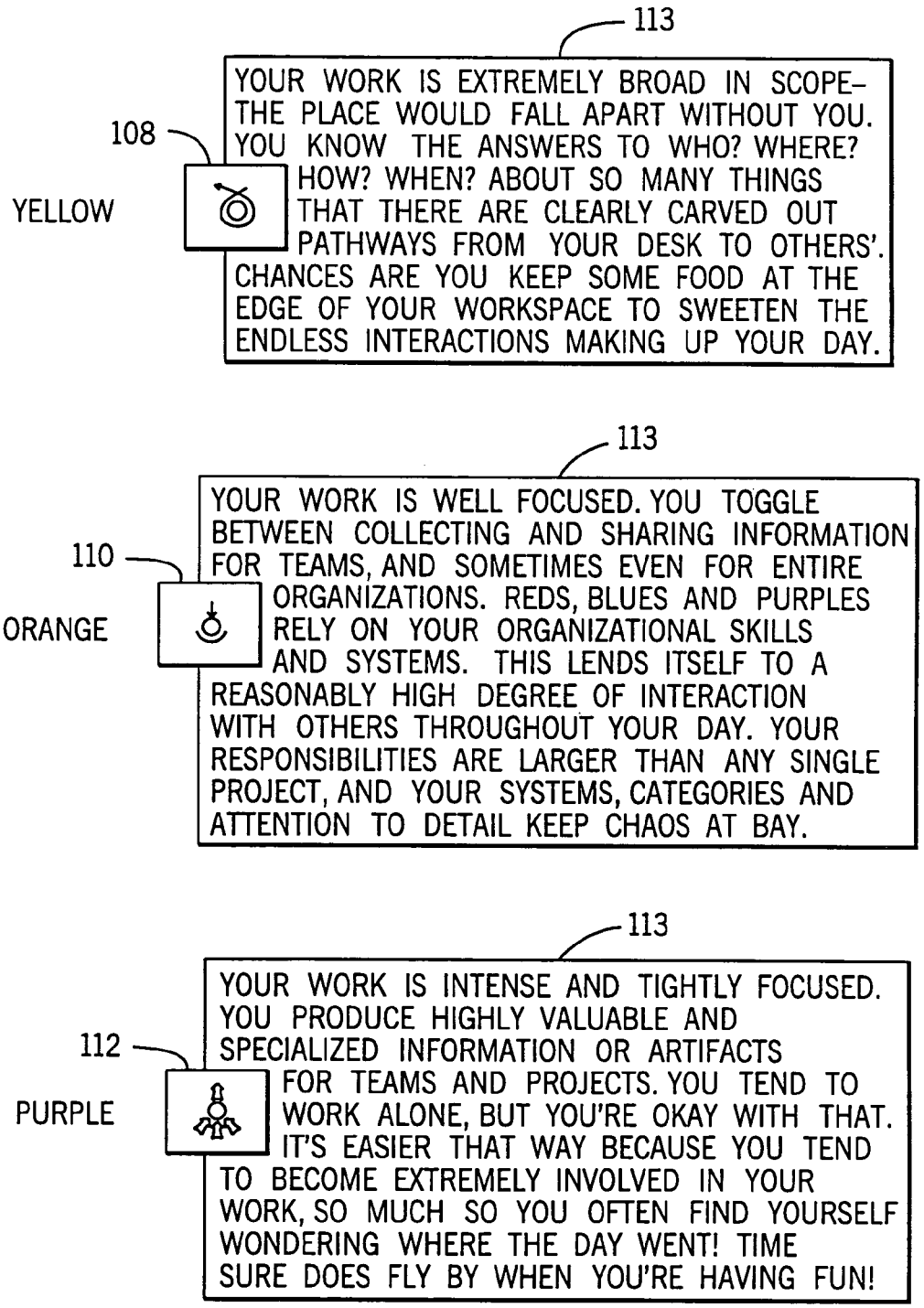
Figure 8:
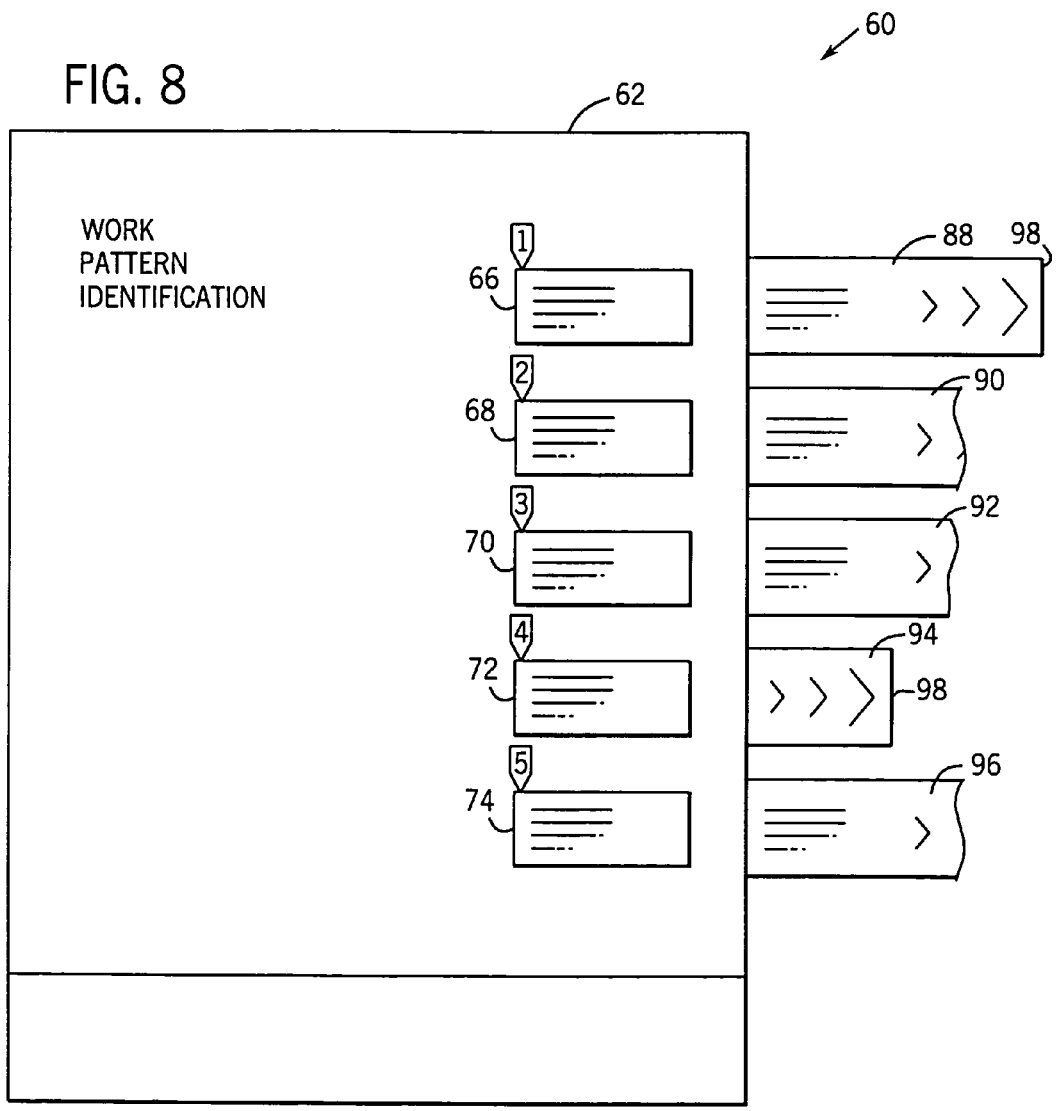
FIG. 8 is a front view of the diagnostic tool of FIG. 6 showing questions, apertures and tabs that may be manipulated to input work pattern data associated with an individual.
Figure 9:
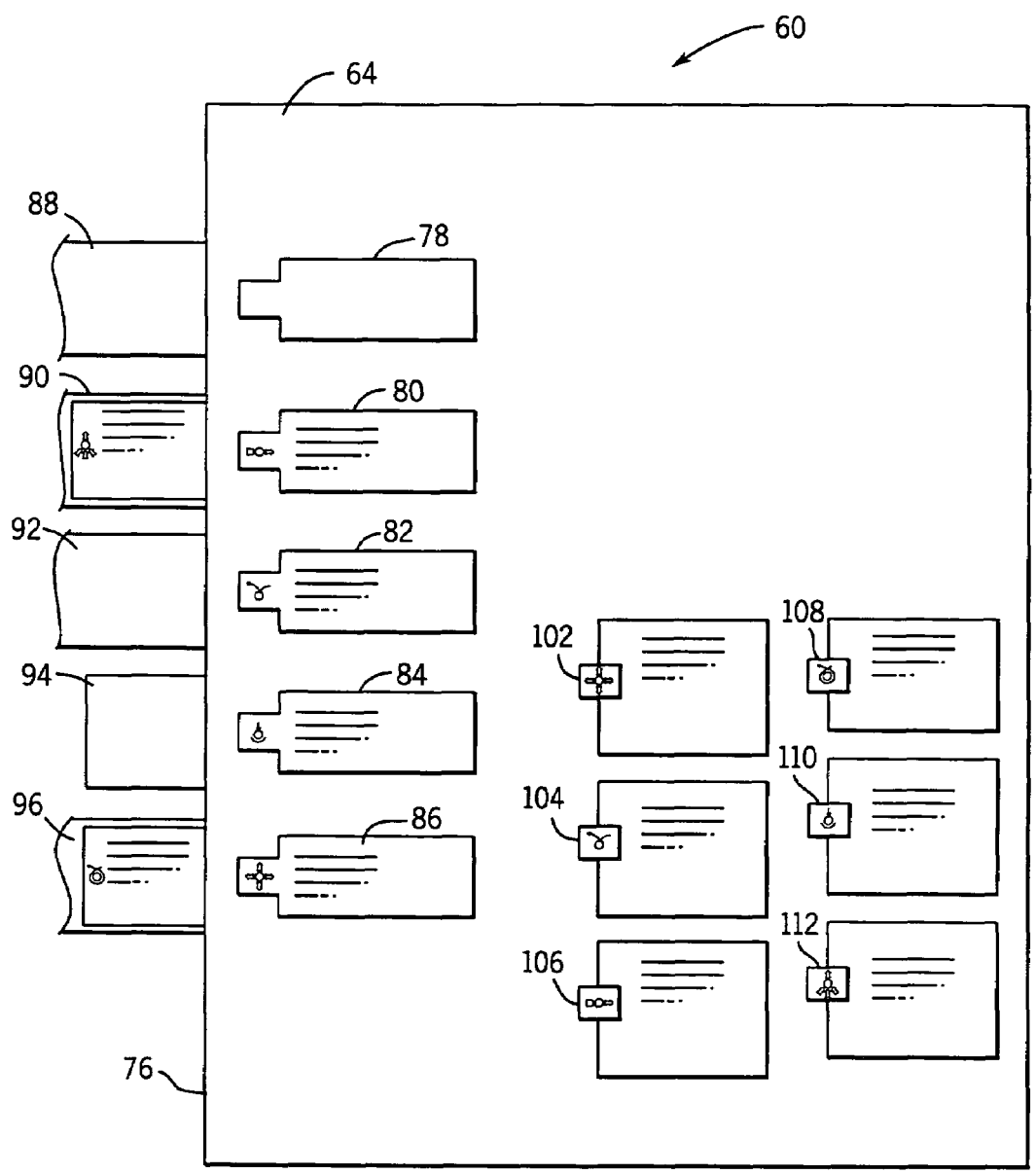
FIG. 9 is a back view of the diagnostic tool of FIG. 6 showing the classification of the individual as a member of a work pattern group based on the relationship between the manipulable tabs and the apertures on the back side of the tool.

The method implemented by such a diagnostic tool is illustrated in the flow chart of FIG. 5. As described above, the tool includes a plurality of work pattern groups, each of which is defined by a plurality of work pattern characteristics. Work pattern data associated with the individual is measured or accessed by the tool (step 48). The work pattern data includes data relevant to the individual's work role and is related to the work pattern characteristics that define each of the plurality of work pattern groups. Thus, for example, the work data may include information about the amount of interaction with others that is required; whether the individual stores information or objects for others; whether the individual spends most of the work day at his assigned work station or frequently moves about the work organization; whether the individual archives information and if such archives are personal or communal; the type of information with which the individual works; whether the individual manages information for others or uses the information to perform his primary work function; etc.

This work pattern data is correlated with the work pattern characteristics of each of the plurality of work pattern groups to find the best match between the individual data and the work pattern characteristics of the work pattern groups (step 49). Based on this correlation, the individual is classified as a member of at least one of the work pattern groups (step 50). More than one group classification may be necessary if the correlation reveals that the individual has a primary work role and a secondary work role (e.g., an emerging or fading work role) The individual's classification may then be placed in the individual's personal profile (step 51).

The individual's work pattern data may also include information that serves to identify the individual's preferred personal knowledge management style (step 52). Thus, the data may also include information relevant to whether the individual typically organizes information in visible piles on his desktop; whether the individual has a tendency to keep information collections out of sight; whether the individual prefers to categorize information and collections of information alphabetically, chronologically or by some other categorization method; etc. The identified personal style may then be included as a component in the individual's personal profile (step 51).

The diagnostic tool may also include a plurality of organizational information flow models, such as the four organizational models described above, each of which is defined by information flow characteristics. Organizational data associated with the way in which information flows in the organization in which the individual works may also be measured or accessed by the diagnostic tool (step 53). Thus, for example, organizational data may include information about whether all the individuals in the organization look to a central person for guidance and direction; whether everyone stores and draws information from a common pool; whether individuals work independently and exchange information on an ad hoc basis; etc. This organizational data is correlated with the information flow characteristics of each of the plurality of organizational information flow models (step 54). Based on this correlation, the type of organization in which the individual works may be identified (step 55) and included in the individual's personal profile (step 51).

The personal profile is then used to prescribe a knowledge management solution for the individual (step 56).

In general, a diagnostic tool for performing the steps illustrated in the flow chart of FIG. 5 includes a plurality of predefined work pattern groups and advantageously includes the six work pattern groups 10–20. The diagnostic tool also includes an interface for inputting work pattern data associated with an individual and a diagnostic engine for correlating the data with the work pattern characteristics which define the work pattern groups. The diagnostic tool, and its constituent components may be implemented in various embodiments, such as an interactive brochure or question and answer form included as a magazine insert or used in conjunction with an knowledge management consultant or at a knowledge management seminar; an information kiosk at a retailer which allows entry of data via a touch-screen console; or an interactive web site accessible via the Internet or World Wide Web.

An exemplary embodiment of a diagnostic tool 60 for classifying an individual as a member of a work pattern group is illustrated in FIGS. 6–9A. Tool 60 may be found in an information rack of a point-of-purchase display, in a magazine, or may be used by a consultant or handed out to participants at a knowledge management seminar.

Tool 60 is constructed of slightly stiff cardboard or heavy paper, such as the type of material typically used for brochures. The cardboard or paper may be folded in half, or two pieces of cardboard or paper may be partially adhered together, thus creating a front side 62 and a back side 64 with a plurality of pockets (not shown) formed therebetween. Front side 62 includes a plurality of apertures 66, 68, 70, 72, and 74 formed therein that are generally aligned proximate an edge 76 such that each aperture 66–74 provides a window into each of the pockets. Likewise, back side 64 includes a plurality of apertures 78, 80, 82, 84 and 86 formed therein that are generally aligned proximate edge 76 and that also provide a window into each of the pockets. A plurality of moveable tabs 88, 90, 92, 94 and 96 are disposed within each of the plurality of pockets. Tabs 88–96 include a grasping end 98 that extends past edge 76. Tabs 88–96 also include graphics, such as text, symbols or alphanumeric characters, disposed thereon, such that the graphics are viewable through apertures 66–74 of front side 62 and apertures 78–86 of back side 64 when the end 98 of each tab 88–96 is grasped to move the tab in or out of its corresponding pocket. The graphics which are viewable through apertures 66–74 of front side 62 provide directions related to using the tool to identify a work pattern group. The graphics which are viewable through apertures 78–86 of back side 64 identify the resulting work pattern group.

Front side 62 also includes a plurality of questions printed thereon, each question corresponding to an aperture 66–74 and each question directed toward gleaning work pattern data associated with the individual whose work pattern group is being determined. Back side 64 includes a plurality of symbols corresponding to each of six predefined work pattern groups 102, 104, 106, 108, 110, and 112, and text 113 describing the work characteristics associated with each of the work pattern groups 102–112.

To use diagnostic tool 60, all tabs must be fully inserted in the pockets, such that only grasping ends 98 are exposed. The user then inputs work pattern data into the tool by reading question #1 and then pulling tab 88 until the appropriate answer to question #1 is exposed through aperture 66. The answer also provides instructions that direct the user to the next step in the diagnostic process. For example, the answer may direct the user to proceed to question #2, or to look at back side 64 to view the individual's work pattern group classification which has been exposed by manipulating the tabs in accordance with the directions and is viewable through one of the apertures 78–86. The user may then also read the text 113 associated with the identified work pattern group 102–112 to gain information about the work pattern characteristics which define the particular group.

Thus, the combination of the questions, apertures 68–74, moveable tabs 88–96, and the graphics on the moveable tabs which are exposed through apertures 68–74 provide an interface for inputting work pattern data associated with the individual. Further, the combination of apertures 68–74 and 78–86, moveable tabs 88–96, the graphics on the moveable tabs that are exposed through apertures 68–74 and apertures 78–86 provide a diagnostic engine for correlating the individual's work pattern data with the work pattern characteristics of the work pattern groups 102–112 and classifying the individual as a member of a particular work pattern group based on the correlation.

The constituent components of the diagnostic tool illustrated in FIGS. 6–9A are exemplary only and the specific layout of a physical embodiment of the tool is not critical. Thus, such a tool may include a different number and form of questions; data can be collected in manners other than by posing questions; answers and directions can be exposed by moveable flaps or some other mechanism rather than moveable tabs; the front and back sides can be arranged in a different manner; work pattern groups can be identified by different symbols or textual characters; the tool can include different work pattern groups or fewer or more work pattern groups; the text describing the work pattern groups can be different, etc.

Further, the diagnostic tool can be used not only to classify an individual as a member of a particular work pattern group, but can also include additional features which allow determination of the personal preferences and style of the individual (e.g., the tools the individual prefers to use, the general manner in which the individual prefers to organize information, etc.), as well as the type of work organization in which the individual is employed. The individual's work pattern group, work organization type, and personal preferences can all be combined in a personal profile that the tool creates for the individual.

For example, referring to FIG. 10, the tool can include further questions, manipulable tabs, apertures, or other features to collect data from which a work organization type can be determined. Thus, the tool can include the question set forth in block 202: "Is most information kept in one or more central locations?" If the user of the tool answers the question in the affirmative, the user is led to the question in block 204: "Is an individual or small group of people responsible for keeping the records?" If the user's response is positive, the tool classifies the user's work organization as followed the "Pooled" information flow model (block 206). If, however, the user answers the question at block 204 in the negative, the tool poses another question (block 208): "Do most of the people in your company organize their information in the same way?" If the answer is affirmative, then the tool classifies the user's work organization as following the "Channeled" information flow model (block 210); if negative, then the user's work organization is classified as following the "Centered" information flow model (block 212).

Returning to block 202 in FIG. 10, if the user answers the question in block 202 in the negative, then the tool leads the user to the question set forth at block 214: "Is there one person you usually look to for the information you need?" If the answer is affirmative, then the tool classifies the user's work organization as following the "Centered" information flow model (block 216); if negative, then the user's work organization follows the "Negotiated" information flow model (block 218).

Figure 11:
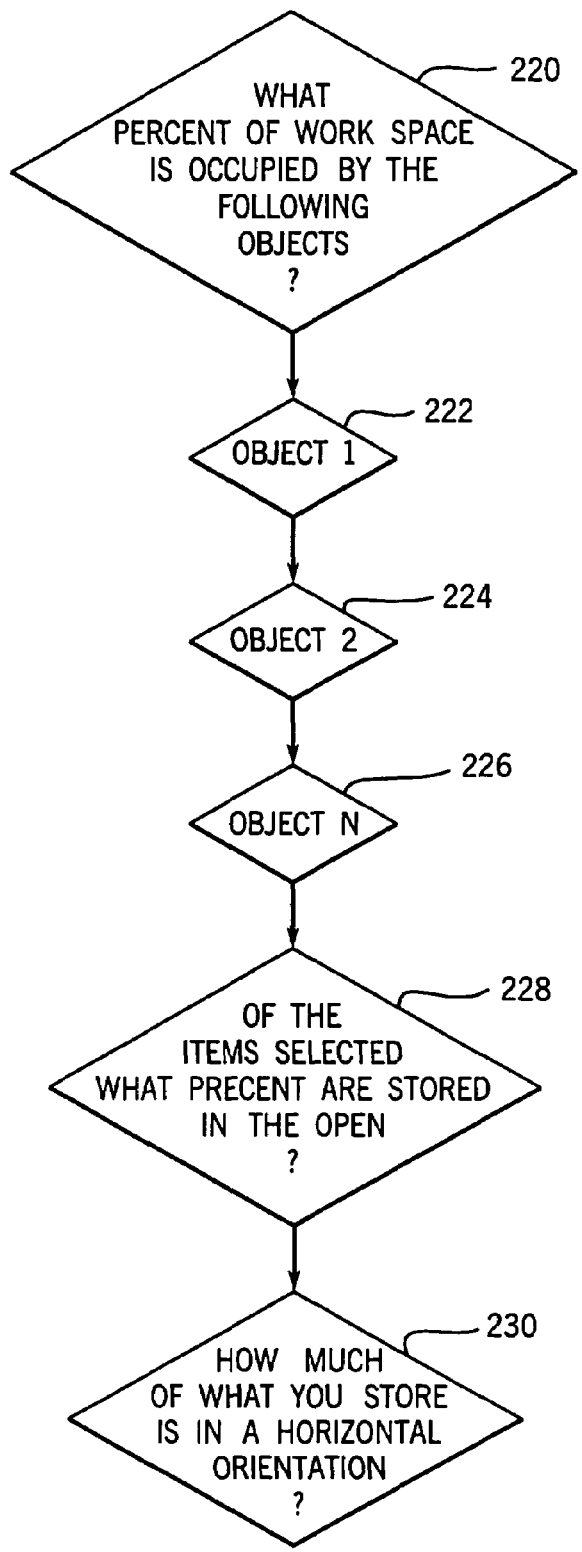
FIG. 11 is a flow chart of a method for determining personal preferences and style that may be implemented by a preferred embodiment of the diagnostic tool.

Referring now to FIG. 11, in an alternative embodiment of the invention, the diagnostic tool can also collect data that reveals information about the user's personal knowledge management style or preferences. For example, the tool can include questions, graphics, manipulable tabs or flaps that enable the user to select objects (e.g., a computer, binders, Think Pad, etc.) that the user often uses (blocks 222–226). Further, the tool can allow the user to indicate what percentage of the user's personal work space is taken up by the selected objects (block 220), whether the objects are kept out in the open (block 228), and how much of what the user stores is in a horizontal orientation within the user's work space (block 230).

Again, the number and form of the questions, layout of the tool, etc., and even the manner in which the tool collects the data needed to lead to a classification of the user's work organization type or personal preferences and style are not critical. Once the data is collected and analyzed, the results of the analysis can be used to create and/or refine the individual's personal profile, and thus more accurately tailor a knowledge management solution.

The diagnostic tool, or portions of the diagnostic tool (e.g., the diagnostic engine), may be embodied in a computer program, or software, that is stored on a digital storage medium (e.g., a floppy disk, a CD ROM, a hard disk drive of a personal computer, the storage medium for a local area network server, the storage medium for a web site accessible via the Internet or the World Wide Web, etc.) and that performs the steps illustrated in the flow charts in FIGS. 5, 10 and/or 11 when executed by or using a computer, such as, for example, a desktop computer, a portable computer, a computer in an information kiosk at a retail store, a computer connected to a local area network server, or a computer that can access the Internet or World Wide Web (e.g., via a Web browser).

Figure 12:
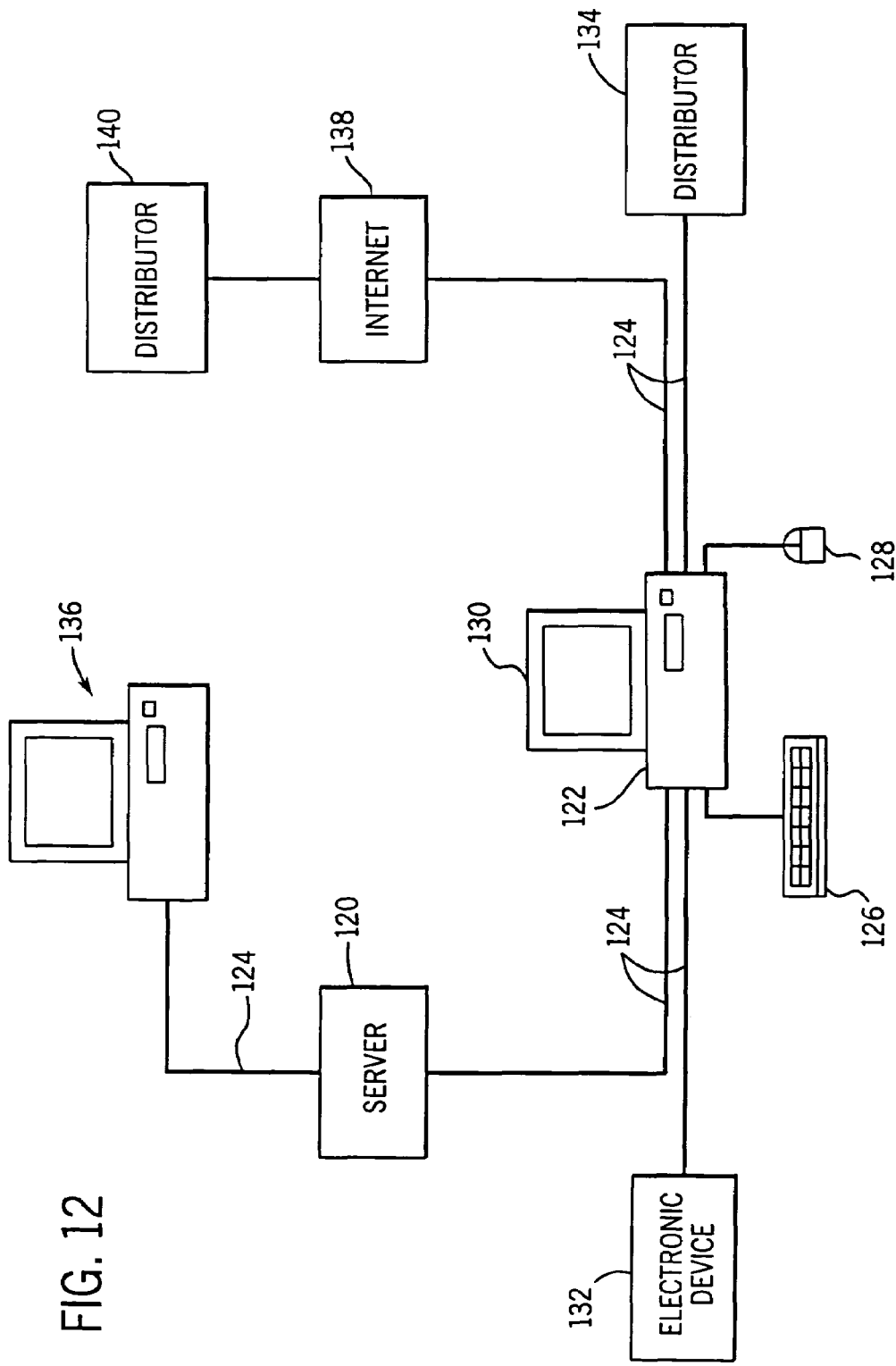
FIG. 12 is an illustration of a computer network in accordance with the invention, in which an embodiment of the diagnostic tool is installed on a computer connected to the network.

As just one example, and referring to FIG. 12, the diagnostic tool may be installed on a network server 120 to which a computer 122 has access via a network 124. Work pattern data associated with an individual may be measured or input to the diagnostic tool via a variety of interfaces. For example, a user may input data via a keyboard 126, a microphone (not shown), a mouse 128 to point to items viewable on a monitor 130, or monitor 130 may be a touch-screen monitor such that the user can simply input data by touching various items on the monitor screen. Or the data may be input or measured via an interface such as a COM port, a peripheral device port, or a network port of computer 122. Thus, work characteristic data may be collected from an electronic device 132 connected to or connectable with the network 124 or directly to computer 122, such as a scanner, an electronic tracking device, another computer, a portable personal information manager (e.g., a Think Pad available from IBM), etc. The work characteristic data can even be input from a remote terminal via a Web page on the Internet. Further, the data may be input or measured by an application program interface that is adapted to extract pertinent work characteristic data from digital knowledge management applications used by the individual via computer 122, such as a scheduling program, a personal information management program, a word processing program, etc.

An exemplary software-based diagnostic tool that implements, for example, all or portions of the steps illustrated in the flow charts of FIGS. 5, 10 and 11, begins by greeting the user with a greeting screen that prompts the user to enter basic information about his work role and to select work activities that appear on the screen that most closely match the user's daily work. After establishing the typical activities of the individual's work, the software tool then allows the user to scroll through a set of images that have been selected from a vast archive of photographed work spaces based on the work activity data the user earlier entered, as well as any other work characteristic data that may have been entered. After the user selects a photograph that most closely matches his work space, a generic sketch is overlaid on the photograph that includes common knowledge management tools, such as a computer, binders, schedulers, etc. The user is then directed to select the most important knowledge management tools that he uses in his own job and to use directional controls to position the tools in the proper location in the photographed work space. These steps all collect data associated with the user, including the user's work role, his personal knowledge management style and the type of information he uses. Preferably, the software tool also prompts the user to provide data associated with the manner in which information flows in the user's work organization.

The software-based diagnostic tool then correlates the collected data with the work pattern characteristics which define the work pattern groups and/or with characteristics which defined the organizational information flow models. A feedback screen informs the user of his personal profile, which includes a description of the user's primary (and secondary, if applicable) work pattern group and the work pattern characteristics which define the group, and preferably also takes into consideration the user's work organization type and the user's personal preferences. The user can then explore knowledge management solutions tailored for the user based on his personal profile.

Such knowledge management solutions may be found in a catalog, which lists products that are suited for members of a particular work pattern group. Or, armed with the personal profile, the user may explore knowledge management solutions with a knowledge management design consultant or a distributor of knowledge management products. Alternatively, the software-based tool can proceed a step further and present another screen to the user which includes a knowledge management solution prescribed by the tool based on the personal profile.

If the software-based tool is installed on a computer that has access to a network, such as computer 122 and network 124 illustrated in FIG. 12, the user can order products directly from a distributor or manufacturer 134 who also is linked to network 124. Or, the user's electronic order can be sent, via a local area network, to a purchasing department 136 in the user's work organization. The purchasing department then completes the user's order by conventional means. Also, for example, if the software-based tool is based on the World Wide Web or Internet 138, the solution can include hypertext links to other web sites that enable the user to examine and order recommended knowledge management tools directly from a manufacturer or a distributor 140, or that enable the user to enroll in a recommended knowledge management seminar or make an appointment with a knowledge management consultant.

Figure 13:
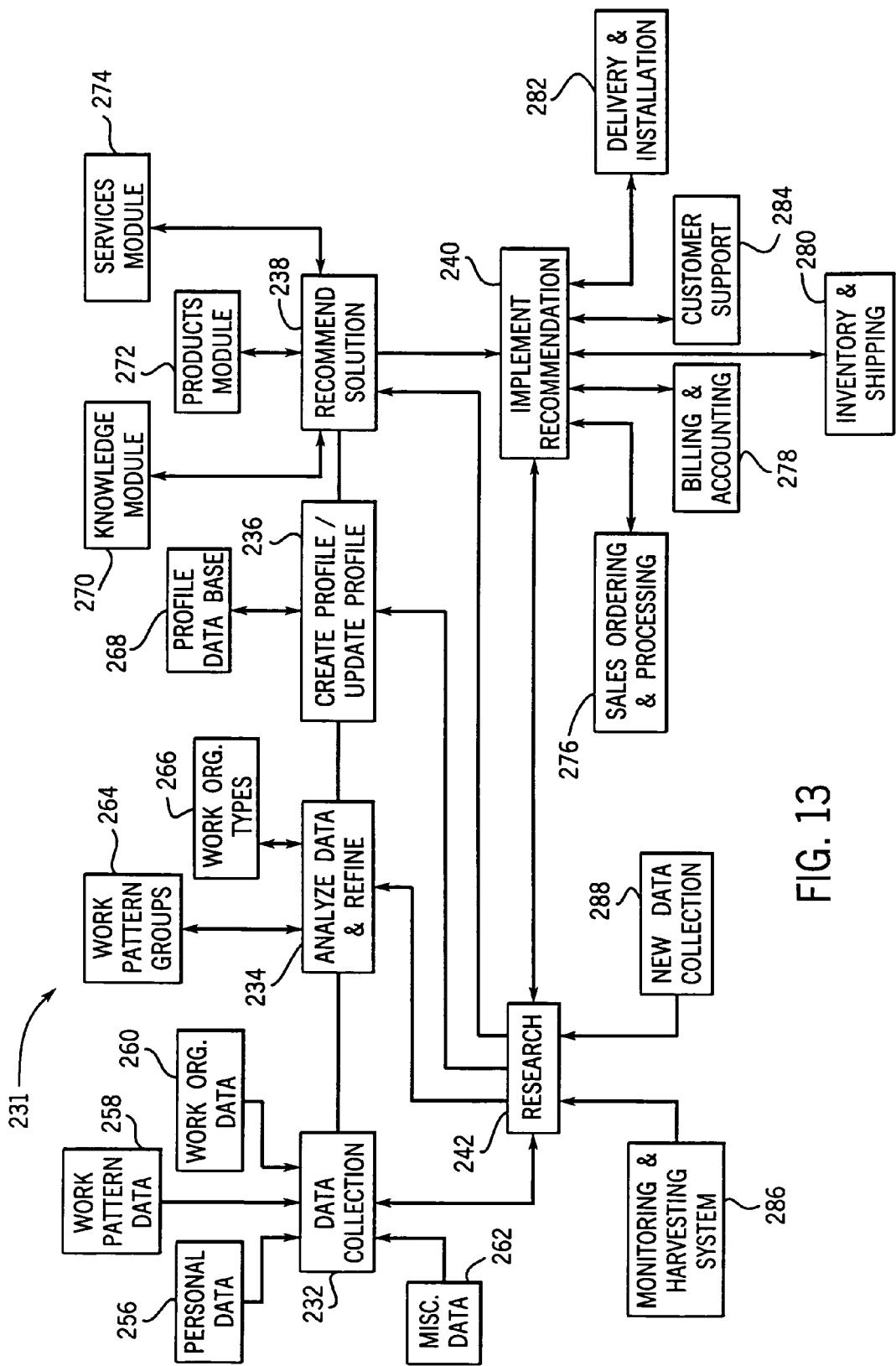
FIG. 13 is a block diagram of a system in which the diagnostic tool is implemented in accordance with one aspect of the invention.

Thus, it is apparent that the diagnostic tool can be implemented in a system 231 in which the diagnostic tool is but one component. For example, referring to the block diagram in FIG. 13, system 231 preferably includes a "Data Collection" component 232, an "Analyze Data and Refine" component 234, a "Create Profile/Update Profile" component 236, a "Recommend Solution" component 238, an "Implement Recommendation" component 240, and a "Research" component 242.

The components of system 231 can all be software-based, or some components may be physical while others are software-based or partially software-based. For example, Data Collection component 232 can include a hard copy of a questionnaire, a telephone, a "soft" questionnaire accessible at a Web site or installed on a computer, etc. Further, various components of system 231 can be physically remote from other components. For example, Analyze Data and Refine component 234 may be installed on a computer located at a dealer's place of business, while portions of Implement Recommendation component 240 may be installed on a Web server and other portions installed on a LAN server at a manufacturer's place of business. In the embodiment of the invention described below, it is contemplated that the various components of system 231 are primarily software-based and, thus, they shall be described as such.

Regardless of the physical configuration of system 231, before data is collected by Data Collection component 232, a mode of interaction with system 231 is preferably determined. For example, the user of the system may be an entity other than an individual worker, such as a representative of the work organization, a consultant or design firm engaged to design or recommend a new office space layout, a distributor, dealer or manufacturer of office furniture or supplies, or any combination of such entities. In such a case, various components of system 231 may be tailored for use by the different kinds of entities and/or may exist in different formats. For example, Data Collection component 232 may request different types of data based on the entity. Further, Recommend Solution component 238 may recommend different types of solutions based on the entity. For example, a design firm using the system would be interested in floor plans for the organization, as well as storage products for individuals within the organization. Thus, Recommend Solution component 238 may suggest various floor plan layouts as well as specific individual workstations. Preferably, the system in this scenario allows for interplay between recommended solutions, such that, for example, modifications to selected floor plans would result in recommendations of individual workstations that are compatible with the floor plan, and vice versa.

The mode of interaction may also determine the form of the diagnostic tool available for use as well as the availability or method of access to components of system 231. For example, if the user is an individual worker or a distributor who is accessing system 231 via the World Wide Web or Internet, then components of system 231 (e.g., Data Collection component 232, Analyze Data and Refine component 234, etc.) can be launched from a Web site of a provider/designer of system 231, from the Web site of an entity (e.g., a dealer, manufacturer, work organization, etc.) that has a cooperative agreement with the provider of system 231, or links can be provided to other Web sites (e.g., the Web site of a distributor or manufacturer who offers recommended products, the Web site of a consulting service who offers knowledge management services or seminars, etc.).

Figure 14:
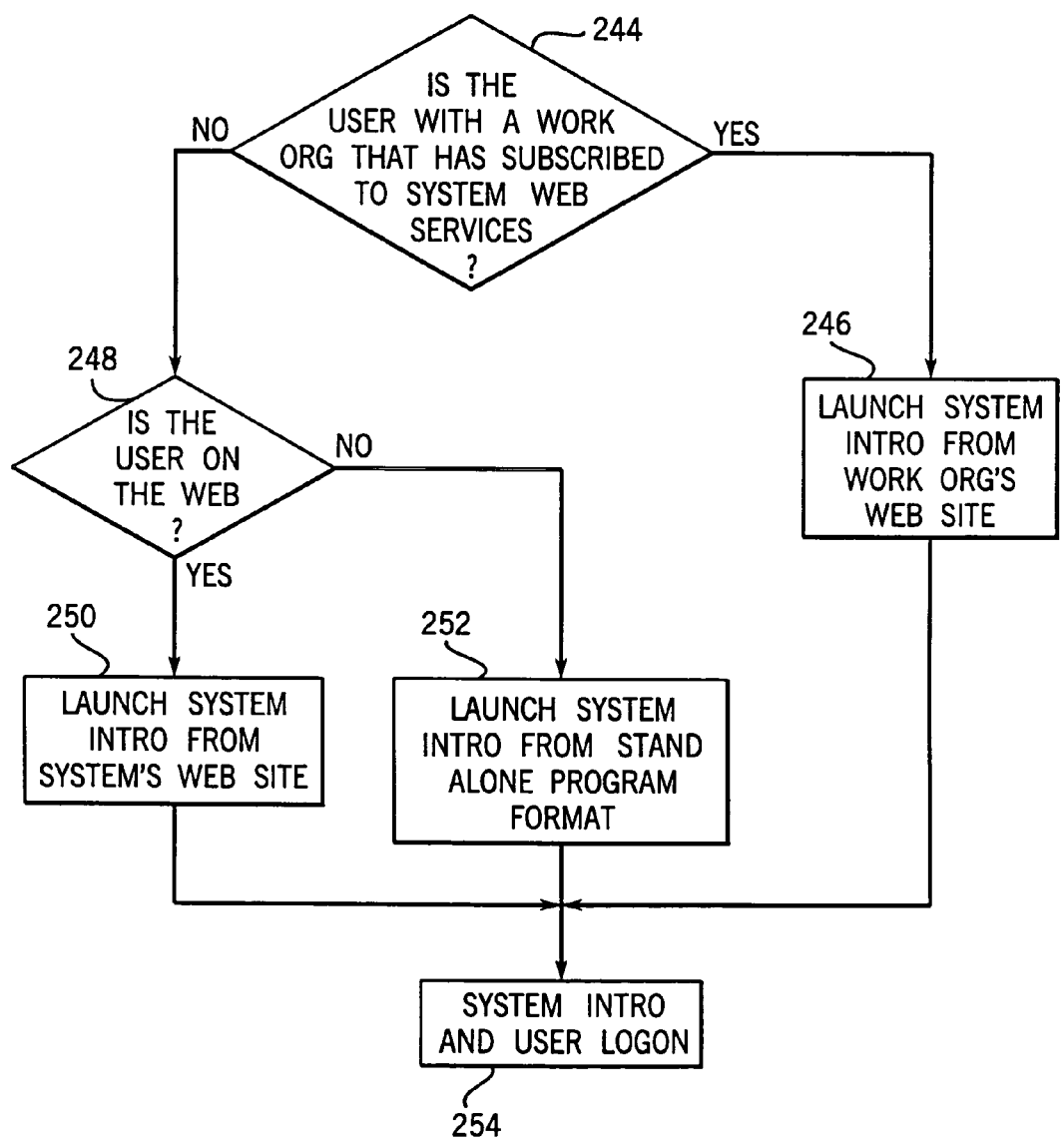
FIG. 14 is a flow chart of a method for determining a mode of interaction with the system prior to launching the system of FIG. 13.

FIG. 14 illustrates a flow chart of exemplary steps to determine a mode of interaction. A determination is first made whether the user is with a work organization that has previously subscribed to system 231 services and, thus, has access to system 231 via the work organization's Web site (step 244). If yes, then, an introduction to system 231 can be launched from the work organization's Web site (step 246), such as, for example, clicking on a hypertext link. If the user does not work for an organization that has a subscription, then it is determined whether the user has access to the World Wide Web (e.g., whether the user can access the system's Web site) (step 248). If yes, then an introduction to system 231 is launched from the system's Web site (step 250). If not, then the introduction can be launched from a standalone program format (step 252). For example, all or part of system 231 can be stored on a storage medium, such as a CD ROM, a hard disk drive or the storage device for a network server, etc. Thus, the system introduction can be launched by executing the program stored on the storage medium. After the system introduction is launched, the user preferably is prompted to log on to system 231 (step 254).

Once the mode of interaction is determined and the user has logged on, Data Collection component 232 collects data sufficient to enable subsequent analysis by Analyze Data component 234. The data may be collected in various forms, both electronically and manually, from various sources, both digital and physical, and by using the diagnostic tool described above. Regardless the form or the source, the type of data collected generally adheres to the categories illustrated in FIG. 13: personal data 256, work pattern data 258, work organization data 260, and miscellaneous data 262.

Personal data 256 preferably includes the user's name, address, job function and name of work organization, and whether the user works at home, in the office or is mobile. Personal data 256 can also include information about the individual's personal knowledge management preferences, such as the types of tools the individual prefers or the manner in which the individual prefers to organize information. Work pattern data 258 includes the work pattern data associated with the individual that relates to the characteristics which define the work pattern groups, as discussed above. Work organization data 260 includes data relating to the manner in which information flows in the work organization and, thus, that defines the work organization types, as discussed above. Miscellaneous data 262 is any other type of data that may be useful in recommending a knowledge management solution. For example, miscellaneous data 262 can include physical information about the work organization, such as dimensions and layouts of various buildings. Or, miscellaneous data 262 can include data about the type of industry in which the individual works, the geographical region in which the individual works or resides, the cultural region in which the individual works or resides, etc.

It should be noted that the categories of data presented above are not static, rigid, or independent of one another. Thus, a particular piece of data could easily fall into any of the above-mentioned categories or otherwise be categorized in a different manner.

After the data is collected, the data is analyzed by Analyze Data component 234. Component 234 preferably includes the diagnostic engine of the diagnostic tool described above, which correlates the collected data with the predetermined characteristics that define work pattern groups 264 and/or work organization types 266.

The analysis of the data preferably results in a classification of the individual as a member of one of the work pattern groups and a classification of the individual's work organization as following a particular information flow model. These results are included in a profile for the individual, together with any personal preference data. The profile is then produced and/or published by Profile component 236. Created profiles may be stored in a Profile Database 268 (digital or physical) such that the profile may later be recalled and updated or refined based on additional data associated with the individual or work organization or newly acquired knowledge which has bolstered or expanded upon the definitions of the work pattern groups 264 and/or work organization types 266.

The Recommend Solution component 238 then determines and/or publishes a recommended knowledge management solution based on the individual's profile. Preferably component 238 derives a solution by consulting a plurality of modules or databases, such as a Knowledge module 270, a Product module 272, and a Service module 274. Modules 270–274 include knowledge (e.g., hints, tips, or discussions regarding knowledge management practices, etc.), products, and services which are associated with work pattern groups and/or work organization types and/or personal preferences. Thus, for example, if the individual's profile indicates that the individual is a Broker in a Centered organization and has particular preferences, then component 238 will recommend a solution that includes knowledge, products, and/or services that correspond or are compatible with the Broker work pattern group and/or the Centered organization type and/or the particular preferences.

Once the user has been presented with a recommended knowledge management solution, the solution can be implemented by Implement Recommendation component 240. Component 240 allows the user to select the particular products and/or services or access the knowledge that is offered. In the preferred embodiment, component 240 allows the user to indicate whether the user desires to purchase or lease the selected products and then provides access or directs the user to a manufacturer or distributor of the selected products or a provider of a selected service. For example, component 240 may simply provide the user a telephone number or address of a product or service source, or, more preferably, component 240 allows establishment of a communication link over a network (e.g., a LAN, the Internet, etc.) to a system of the product source through which the user can directly order the products or services. For example, component 240 may be executed by a computer which also includes communication software, browser software, a serial port and a modem such that a communication link can be established to a product source via the Internet. It should be noted that the source of a product or service can also be the provider of system 231 or any other entity which has a cooperative arrangement with the provider of system 231. If a communication link to a source can be established, component 240 also preferably provides access to the source's business systems, such as a sales ordering and processing system 276, a billing and accounting system 278, an inventory and shipping system 280, a delivery and installation scheduling system 282, and a customer support system 284 which can provide user manuals, help-line support, etc. After processing of the order for the knowledge management solution is complete, the solution is delivered and/or installed.

System 231 also includes Research component 242 which incorporates many features that allow for continued refinement and improvement of the various other components of system 231. For example, Research component 242 can include a Monitoring and Harvesting system 286 which can track or gather information about the delivered knowledge management solution, such as quality, effectiveness, suitability, etc. of the various products and/or services included in the solution. System 286 could gather such information through the implementation of quality assurance programs or user reviews. Or, system 286 could gather such information by monitoring the use of the solution. For example, system 286 could electrically harvest data from software-based applications that the individual is running or from electronic products that the individual is using. Such electronic products could be part of the knowledge management solution. Or, system 286 could monitor use of the knowledge management solution via anthropologists who visit the work organization. Thus, monitoring and harvesting of additional data can be accomplished either overtly or covertly, manually or through the use of electronic devices or software programs. In any event, the information that is gathered can be used to improve or add to the database of knowledge, products and services (including the sources that provide products and services), improve the correlation of knowledge, products and service to work pattern groups and organization types such that more appropriate knowledge management solutions can be devised, or even contribute or improve upon the knowledge base which defines the work pattern groups and work organization types.

Monitoring and Harvesting system 286 can also provide the capability of updating profiles stored in profile database 268. For example, an individual's profile can be continually updated, either overtly by directly inputting work pattern data associated with the individual or covertly by the capture and collection of work pattern data from other electronic devices or application programs or based on the individual's use of such electronic devices or programs. Consequently, the individual's knowledge management solution can be updated as the data underlying the individual's personal profile solidifies or as the definition of the work pattern groups themselves becomes more robust. Or, the profile and knowledge management solution can be updated if the collected data evidences the emergence of a new or changing work role for the individual or a transition into another work pattern group, or if the flow of information within the individual's organization begins to follow a different organizational information flow model. Further, maintaining the personal profile for the long term allows refinements in the individual's knowledge management solution that are based on technological advances in knowledge management devices and methods.

Research component 242 can also include a New Data Collection system 288 which gathers information about technological advances, including new products, services, and/or methods, that are appropriate for inclusion in the knowledge, product, and service modules 270–274 and which thus affect Recommend Solution component 238. Or new data can be collected about the capabilities of the sources of products and services, resulting in improvement or additions to Implement Recommendation component 240.

Further, New Data Collection system 288 can collect new information to improve the overall knowledge base of the system via further studies of the manners in which individuals work and information flows within organizations. For example, such studies could focus on environmental, regional, or cultural factors which could influence the definitions of the work pattern groups. Or, the studies could focus on a variety of industries, such that the effect a particular type of industry has on the way in which an individual works or information flows within an organization could be better understood. Thus, such studies could result in more robust and/or additional definitions of work pattern groups and work organization types.

Research component 242 can also extract data that can be useful for improving the overall knowledge base of the system simply by studying the data collected by the Data Collection component 232.

From the foregoing description, it is apparent that Research component 242 preferably interacts with other components of system 231, both in terms of receiving data from various components and improving upon various components. Thus, Research component 242 results in continuous improvement and enhancement of the overall system.

Figure 15:
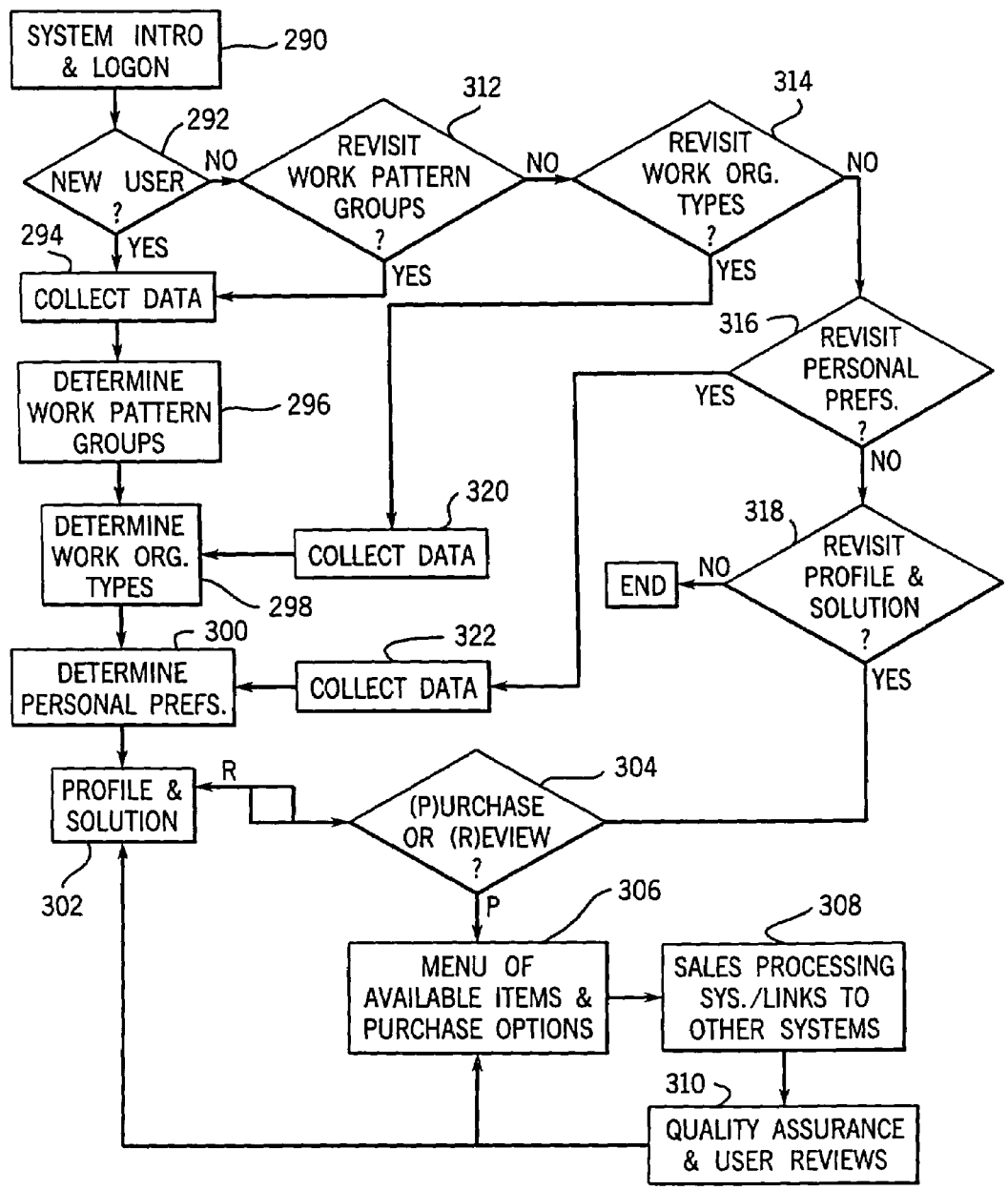
FIG. 15 is a flow chart of the process that may be carried out by the system of FIG. 13 in accordance with a preferred embodiment of the invention.

A flow chart of the preferred capabilities offered to a user of system 231 is illustrated in FIG. 15. After the user has viewed the system introduction and logged on (step 290), a determination is made whether the user is a new user (i.e., has signed onto the system for the first time) (step 292). If so, then the data collection component of system 231 is launched and the necessary data collected, as described above (step 294). Based on the collected data, the user is classified as a member of a particular work pattern group (step 296), and the user's work organization is identified as following a particular work information flow model (step 298). The user's personal knowledge management preferences are also accounted for (step 300). An individual profile is produced and a knowledge management solution, including, for example, products, services and discussions of knowledge management practices and procedures, is recommended based on the classifications of the user, the user's work organization, and the user's personal preferences (step 302).

The user is then provided the option of purchasing the recommended products or services (step 304). If the user decides to proceed with a purchase, a menu of available products and services, sources for the products and services, and purchase options (e.g., purchase, lease, etc.) is offered (step 306). Selection of items from the menu launches a sales processing system (step 308), which preferably includes establishing a communication link (e.g., over a proprietary network, over the Internet, etc.) to sources (e.g., manufacturers, dealers, distributors, service providers, consultants, etc.) of the products and services, and, preferably, to the sources' internal systems (e.g., accounting, billing, inventory, shipping, delivery systems, etc.).

After delivery of the products and/or services, quality assurance and user review programs are established (step 310) which provide information useful in refining future solutions recommended at step 302 and the available items presented by the menu offered at step 306.

Various components of system 231 can be revisited by a particular user. This feature is useful if, for example, the user's work role changes or if the user needs more than one solution because the user works both at home and at a work organization. Or, the user may have new information that the user desires to input such that the profile and resultant solution can be better tailored. As another alternative, the user may simply want to revisit the solution to learn more about the user's classification or to gather more information about useful knowledge management practices. In yet another scenario, the user may want to order additional products and services or replacement products, such as a new kit of office supply products.

Regardless of the reason, the user may log on to the system and, after it is determined that the user is not a new user (step 292), the user is preferably given the options of revisiting either the work pattern group classification component (step 312), the work organization classification component (step 314), the personal preferences component (step 316), or the profile and solution component (step 318).

If the user revisits the work pattern group classification, additional data may be collected (step 294) and the work pattern group classification can be predetermined or updated (step 296). If the user revisits the work organization classification, additional data may be collected (step 320), and the work organization classification can be predetermined or updated (step 298). A similar sequence of steps occurs if the user revisits the personal preferences component (step 322 and 300). If the user chooses the option of revisiting the profile and solution (step 318), then the user is next asked whether the user desires to review the profile and solution or purchase available items (step 304). If review is desired, the user is led to the profile and solution (step 302). If purchase is desired, the user proceeds to the menu of available products and services (step 306).

A user may elect to revisit the solution for several different reasons. For example, the user may not have proceeded with purchase of available items the first time that the user was logged onto the system. Or, the user may want to purchase additional or replacement products that were recommended. Still further, the user may simply want to learn more about knowledge management practices. Or, perhaps, new products and services are now available.

Revisiting the profile and solution may be facilitated in the preferred embodiment of the invention by tagging the products delivered to the individual with identifiers that correspond to a Web site through which the individual may access system 231, log on as a user, and then revisit the individual's profile and solution. In addition or alternatively, the tag may correspond to the individual's work pattern classification such that the individual can be informed of his or her classification and can learn more about the classification from available sources, such as a Web site or even a catalog or brochure which discusses the work pattern groups.

The foregoing description of FIG. 15 has referred to a user of the system and has discussed providing a profile and recommending a solution for the user. It should be understood, however, that the user of the system may be using the system on behalf of another entity and, thus, the generated profile and solution would be produced for the other entity.

A work organization that uses system 231, or any component of system 231, can benefit in many ways other than the systematic determination and provision of knowledge management solutions for individuals in the work organization. For example, the use of system 231 ensures that the manner in which individuals collect, store and use information is known. Thus, retrieval of information from anyone or anywhere in the organization is greatly facilitated, which, in turn, enhances the efficiency and effectiveness of the work organization as a whole.

It should be further understood that the foregoing description is of preferred exemplary embodiments of this invention, and that the invention is not limited to the specific form shown. For example, the classification of individuals into work pattern groups provides a vehicle by which products, such as software applications, can be specifically designed with features that are adapted or tailored for a particular work pattern group. Thus, a certain word processing application, for example, may be provided with attributes that are well-suited for the Broker group.

Although only a few exemplary embodiments of this invention have been described in detail above, those skilled in the art will readily appreciate that many modifications are possible in the exemplary embodiments (such as variations of forms, features, types or numbers of classifications or patterns, titles, values or parameters, applications, etc.) without materially departing from the novel teachings and advantages of this invention. As is readily indicated, the invention can be employed or implemented with any of a variety of systems, including computing systems (i.e. through any combination of hardware and/or software). The system and/or method of the present invention may be implemented or practiced either with or without the use of a computing device (or network) or with any of a wide variety of computing devices or other information technology, according to alternative embodiments. Moreover, the particular values of the signals and logic/control program (e.g. parameters, patterns, set of instructions or operations, etc.) may vary within the spirit of the present invention from application to application depending on particular static and dynamic characteristics or goals presented. The order of steps, for example, may also be varied or resequenced according to alternative embodiments of the invention. Use of the term "computer" is intended to cover any type of computing device; use of the term "network" is intended to cover any type of networking arrangement (e.g., conventional network, Intranet, Internet, wireless, etc.). Accordingly, all such modifications are intended to be included within the scope of the invention as defined in the following claims. In the claims, any means-plus-function clause is intended to cover the structures described herein as performing the recited function and not only structural equivalents but also equivalent structures.

Other substitutions, modifications, changes and omissions may be made in the design, operating conditions and arrangement of the preferred and alternative embodiments without departing from the spirit of the invention as expressed in the appended claims.

What is claimed is:

1. A tool for classifying an individual within an organization based on work pattern data obtained from the individual for use in providing an office space layout for the individual to facilitate knowledge management based on the classification of the work pattern data, comprising:

an interface for obtaining work pattern data associated with the individual; and a system for correlating the work pattern data from the individual with at least one work pattern comprising predefined characteristics so that the individual can be classified as a member of at least one work pattern group based on the correlation of the work pattern data from the individual to the predefined characteristics of at least one work pattern corresponding to at least one work pattern group;

Classifying the individual wherein work pattern data used to classify the individual within at least one work pattern group comprises (a) an amount of interaction by the individual with other individuals, (b) a degree to which work performed by the individual is focused, or (c) a degree to which work performed by the individual adheres to a defined procedure;

generating an office space layout wherein the office space layout for the individual comprises at least one of a workstation, a storage product, office furniture or office supply products selected according to the classification of the individual within the at least one work pattern group;

wherein the at least one work pattern group comprises a first group, a second group, a third group, a fourth group, a fifth group, and a sixth group;

wherein work characteristics associated with the first group include a tight work focus, highly protocoled work processes, and a low degree of interaction with other individuals in the work environment;

wherein work characteristics associated with the second group include a contextual work focus, moderately protocoled work processes, and a moderate degree of interaction with other individuals in the work environment;

wherein work characteristics associated with the third group include a wide work focus, logistics-oriented work processes, and a high degree of interaction with other individuals in the work environment;

wherein work characteristics associated with the fourth group include a wide work focus, highly variable work processes, and a high degree of interaction with other individuals in the work environment;

wherein work characteristics associated with the fifth group include a contextual work focus, moderately variable work processes, and a moderate degree of interaction with other individuals in the work environment;

wherein work characteristics associated with the sixth group include a tight work focus, well-defined work processes, and a low degree of interaction with other individuals in the work environment.

2. The tool of claim 1 wherein the predefined characteristics of each work pattern are based on characteristics of individuals understood to be members of a corresponding work pattern group and comprise a degree to which work performed by a member of the corresponding work pattern group is focused, an amount of interaction between a member of the corresponding work pattern group and other individuals, and a degree to which work performed by a member of the corresponding work pattern group follows a defined procedure.

3. The tool of claim 2 wherein the predefined characteristics of each work pattern further comprise a type of information used by a member of the corresponding work pattern group, a number of work foci of a member of the corresponding work pattern group, and a degree of mobility within the work environment of a member of the corresponding work pattern group.

4. The tool of claim 1 wherein the at least one work pattern group comprises a Processor group, a Keeper group, a Concierge group, a Broker group, a Player group, and a Specialist group.

5. The tool of claim 1 wherein the predefined characteristics comprise a degree to which work performed by a member of the corresponding work pattern group is task-based and a degree to which work performed by a member of the corresponding work pattern group is knowledge-based.

6. The tool of claim 1 wherein the system comprises a diagnostic engine comprising digital data stored on a digital storage medium.

7. The tool of claim 6 wherein the digital storage medium is computer hard disk drive.

8. The tool of claim 1 wherein the interface is an interactive questionnaire.

9. The tool of claim 1 wherein the system comprises a diagnostic engine.

10. The tool of claim 9 wherein the diagnostic engine comprises a computing device.

11. The tool of claim 1 wherein the system comprises a database configured to correlate the work pattern data with the predefined characteristics of at least one work pattern.

12. A system for providing an office space layout for an individual in a work environment to facilitate knowledge management, comprising:
a diagnostic tool;
an interface coupled to the diagnostic tool for obtaining work pattern data associated with the individual;
a plurality of work patterns; and
a prescription tool;
wherein the diagnostic tool provides a correlation of the work pattern data with at least one of the work patterns and defines a personal profile for the individual based on the correlation and wherein the prescription tool recommends the office space layout for the individual based on the personal profile, wherein the personal profile comprises at least one work pattern characteristic for the individual;
wherein the plurality of work patterns correspond to at least a first group, a second group, a third group, a fourth group, a fifth group, and a sixth group;
wherein work characteristics associated with the first group include a tight work focus, highly protocoled work processes, and a low degree of interaction with other individuals in the work environment;
wherein work characteristics associated with the second group include a contextual work focus, moderately protocoled work processes, and a moderate degree of interaction with other individuals in the work environment;
wherein work characteristics associated with the third group include a wide work focus, logistics-oriented work processes, and a high degree of interaction with other individuals in the work environment;
wherein work characteristics associated with the fourth group include a wide work focus, highly variable work processes, and a high degree of interaction with other individuals in the work environment;
wherein work characteristics associated with the fifth group include a contextual work focus, moderately variable work processes, and a moderate degree of interaction with other individuals in the work environment;
wherein work characteristics associated with the sixth group include a tight work focus, well-defined work processes, and a low degree of interaction with other individuals in the work environment.

13. The system of claim 12 further comprising a plurality of organizational information flow models wherein organizational data associated with the work environment of the individual is obtained via the interface and the diagnostic engine correlates the organizational data with the organization information flow models and the prescription tool further recommends the office space layout based on the organizational correlation.

14. The system of claim 13 wherein the organizational information flow models comprise a Channeled model, a Centered model, a Pooled model and a Negotiated model.

15. The system of claim 12 wherein the work pattern data comprises data relevant to an amount of interaction by the individual with other individuals, a degree to which work performed by the individual is focused, and a degree to which work performed by the individual adheres to a defined procedure.

16. The system of claim 12 wherein the first work pattern group is a Processor group, the second work pattern group is a Keeper group, the third work pattern group is a Concierge group, the fourth work pattern group is a Broker group, the fifth work pattern group is a Player group, and the sixth work pattern group is a Specialist group.

17. The system of claim 16 wherein (a) the Processor group comprises a pattern characterized by a narrow work focus, highly protocoled processes, and a low interaction with others; (b) Keeper group comprises a pattern characterized by a contextual focus, adherence to protocols and procedures governing performance of the work, logistics-orientated processes, and a moderate degree of interaction with others; (c) the Concierge group comprises a pattern characterized by a wide focus, logistics-oriented work, and a high degree of interaction with others; (d) the Broker group comprises a pattern characterized by a broad work focus, work activities that follow highly variable and unstructured processes, and a high degree of interaction with others; (e) the Player group comprises a pattern characterized by a changing and contextually focus, work that adapts to and follows variable processes, and a moderate degree of interaction with others; and (f) the Specialist group comprises a pattern characterized by a tight focus, highly specialized and defined processes, and a low degree of interaction with others.

18. The system of claim 12 wherein the personal profile is adapted to be updated with additional work pattern data associated with the individual that is obtained via the interface.

19. The system of claim 12 further comprising a computer and wherein the diagnostic tool is operated with the computer.

20. The system of claim 19 wherein the computer is coupled to a network and the additional work pattern data is provided to the interface via the network.

21. The system of claim 20 wherein an electronic device connectable to the network collects the additional work pattern data.

22. The system of claim 21 wherein the office space layout comprises the electronic device.

23. The system of claim 12 wherein the office space layout comprises knowledge storage products.

24. The system of claim 12 wherein the diagnostic tool comprises digital data stored on a digital storage medium.

25. The system of claim 12 wherein the prescription tool is a product catalog.

26. The system of claim 12 wherein how the individual works within the work environment comprises how the individual collects knowledge.

27. The system of claim 12 wherein how the individual uses knowledge comprises how the individual stores knowledge.

28. The system of claim 12 wherein how the individual uses knowledge comprises how the individual manages knowledge.

29. The system of claim 12 wherein how the individual uses knowledge comprises how the individual shares knowledge.

30. The system of claim 12 wherein how the individual uses knowledge comprises how the individual collects, stores, manages, and shares knowledge.

31. The system of claim 30 wherein knowledge comprises at least one of how to arrange a workspace or how to organize a computer desktop.

32. The system of claim 12 wherein how the individual works within the work environment comprises how the individual uses information, knowledge, or technology.

33. A method of classifying an individual in a work environment as a member of at least one of a plurality of work pattern groups corresponding to at least one of a plurality of work patterns based on work pattern data associated with the individual for use in organizational planning such as providing an office space layout for the individual to facilitate knowledge management in the work environment, using a database containing a plurality of work patterns accessible through a program operating on a computing device, the method comprising:
 measuring first work pattern data of the individual representative of a degree of interaction between the individual and other individuals in the work environment;
 measuring second work pattern data of the individual representative of a degree of focus associated with work performed by the individual in the work environment;
 measuring third work pattern data of the individual representative of a degree of protocol governing the work performed by the individual in the work environment;
 generating a correlation of first work pattern data and second work pattern data and third work pattern data of the individual with at least one of the plurality of work patterns contained in the database by operation of the program on the computing device; and
 classifying the individual as a member of at least one of the work pattern groups based on the correlation between work pattern data and at least one of the plurality of work patterns;
 generating an office space layout wherein the office space layout for the individual comprises at least one of a workstation, a storage product, office furniture or office supply products selected according to the classification of the individual within the at least one work pattern group;
 wherein the work pattern groups comprise a first group, a second group, a third group, a fourth group, a fifth group, and a sixth group;
 wherein work characteristics associated with the first group include a tight work focus, highly protocoled work processes, and a low degree of interaction with other individuals in the work environment;
 wherein work characteristics associated with the second group include a contextual work focus, moderately protocoled work processes, and a moderate degree of interaction with other individuals in the work environment;
 wherein work characteristics associated with the third group include a wide work focus, logistics-oriented work processes, and a high degree of interaction with other individuals in the work environment;
 wherein work characteristics associated with the fourth group include a wide work focus, highly variable work processes, and a high degree of interaction with other individuals in the work environment;
 wherein work characteristics associated with the fifth group include a contextual work focus, moderately variable work processes, and a moderate degree of interaction with other individuals in the work environment;
 wherein work characteristics associated with the sixth group include a tight work focus, well-defined work processes, and a low degree of interaction with other individuals in the work environment.

34. The method of claim 33 wherein the work pattern groups comprise a Processor group, a Keeper group, a Concierge group, a Broker group, a Player group, and a Specialist group.

35. The method of claim 33 wherein the step of generating an office space layout is performed by the program.

36. The method of claim 33 further comprising:
 recommending the office space layout for the individual based on the classification of the individual within at least one of the plurality of work pattern groups.

37. The method of claim 36 wherein the office space layout comprises knowledge storage products.

38. A computer-based method of classifying an individual in a work environment as a member of at least one of a plurality of work pattern groups comprising a first group, a second group, a third group, a fourth group, a fifth group, and a sixth group, using a database of predefined work characteristics accessible through a program operating on a computing device, for use in organizational planning involving the individual within the work environment, the method comprising:
 obtaining data representative of a work characteristic of the individual associated with performance of work by the individual;
 using the program to generate a correlation of the data obtained from the individual with the database of work characteristics accessible on the computing device; and
 identifying the individual as a member of at least one of the plurality of work pattern groups based on the correlation of the work characteristic for the individual;
 wherein work characteristics associated with the first group include a tight work focus, highly protocoled work processes, and a low degree of interaction with other individuals in the work environment;

wherein work characteristics associated with the second group include a contextual work focus, moderately protocoled work processes, and a moderate degree of interaction with other individuals in the work environment;

wherein work characteristics associated with the third group include a wide work focus, logistics-oriented work processes, and a high degree of interaction with other individuals in the work environment;

wherein work characteristics associated with the fourth group include a wide work focus, highly variable work processes, and a high degree of interaction with other individuals in the work environment;

wherein work characteristics associated with the fifth group include a contextual work focus, moderately variable work processes, and a moderate degree of interaction with other individuals in the work environment; and wherein work characteristics associated with the sixth group include a tight work focus, well-defined work processes, and a low degree of interaction with other individuals in the work environment.

39. The method of claim 38 wherein further comprising recommending the office space layout for the individual based on the classification of the individual within at least one of the plurality of work pattern groups.

40. The method of claim 38 further comprising correlating first work pattern data and second work pattern data and third work pattern data of the individual with at least one of the plurality of work patterns and classifying the individual as a member of at least one of the work pattern groups based on the correlation between work pattern data and at least one of the plurality of work patterns.

41. A method for providing an office space layout for an individual in a work environment to facilitate knowledge management, using a database containing a plurality of work patterns accessible through a program operating on a computing device, comprising:

defining a plurality of work pattern groups and a plurality of work pattern characteristics associated with each work pattern group;

collecting work pattern data associated with the individual relating to at least one of a group of characteristics comprising (a) an amount of interaction by the individual with other individuals, (b) a degree to which work performed by the individual is focused, or (c) a degree to which work performed by the individual adheres to a defined procedure;

using the program to generate a correlation of the work pattern data with at least one of the group of characteristics corresponding to at least one of the plurality of work pattern groups;

classifying the individual as a member of at least one of the work pattern groups based on the correlation;

defining a personal profile for the individual, the personal profile including the classification of the individual; and recommending office space layout for the individual based on the defined personal profile;

wherein the office space layout for the individual comprises at least one of a workstation, a storage product, office furniture or office supply products selected according to the classification of the individual within the at least one work pattern group;

wherein the at least one work pattern group comprises a first group, a second group, a third group, a fourth group, a fifth group, and a sixth group;

wherein work characteristics associated with the first group include a tight work focus, highly protocoled work processes, and a low degree of interaction with other individuals in the work environment;

wherein work characteristics associated with the second group include a contextual work focus, moderately protocoled work processes, and a moderate degree of interaction with other individuals in the work environment;

wherein work characteristics associated with the third group include a wide work focus, logistics-oriented work processes, and a high degree of interaction with other individuals in the work environment;

wherein work characteristics associated with the fourth group include a wide work focus, highly variable work processes, and a high degree of interaction with other individuals in the work environment;

wherein work characteristics associated with the fifth group include a contextual work focus, moderately variable work processes, and a moderate degree of interaction with other individuals in the work environment;

wherein work characteristics associated with the sixth group include a tight work focus, well-defined work processes, and a low degree of interaction with other individuals in the work environment;

so that the individual can be classified by measuring a work characteristic of the individual associated with performance of work by the individual and identifying the individual as a member of at least one of the plurality of work pattern groups based on the work characteristic measured for the individual.

42. The method of claim 41 further comprising:
identifying a personal style associated with the individual from the work pattern data wherein the personal profile further comprises the identified personal style.

43. The method of claim 41 further comprising:
defining a plurality of organizational information flow models and a plurality of information flow characteristics associated with each organizational information flow model;

collecting organizational data associated with the individual's work environment;

correlating the organizational data with the plurality of information flow characteristics associated with the organizational information flow models;

identifying the organizational information flow model that corresponds to the individual's work environment based on the correlation; and refining the personal profile to comprise the identified organizational information flow model.

44. The method of claim 41 wherein the office space layout comprises knowledge storage products.

* * * * *